(12) United States Patent
Morozov et al.

(10) Patent No.: US 11,316,721 B2
(45) Date of Patent: Apr. 26, 2022

(54) DEMODULATION REFERENCE SIGNAL FOR PHYSICAL BROADCAST CHANNEL IN NEW RADIO

(71) Applicant: Apple Inc., Cupertino, CA (US)

(72) Inventors: Gregory Morozov, Nizhny Novgorod (RU); Dae Won Lee, Portland, OR (US); Alexei Davydov, Nizhny Novgorod (RU); Seung Hee Han, San Jose, CA (US); Yongjun Kwak, Portland, OR (US)

(73) Assignee: Apple Inc., Cupertino, CA (US)

( * ) Notice: Subject to any disclaimer, the term of this patent is extended or adjusted under 35 U.S.C. 154(b) by 137 days.

(21) Appl. No.: 16/976,624

(22) PCT Filed: Jul. 26, 2018

(86) PCT No.: PCT/US2018/043823
§ 371 (c)(1),
(2) Date: Aug. 28, 2020

(87) PCT Pub. No.: WO2019/023419
PCT Pub. Date: Jan. 31, 2019

(65) Prior Publication Data
US 2021/0006443 A1 Jan. 7, 2021

Related U.S. Application Data

(60) Provisional application No. 62/566,720, filed on Oct. 2, 2017, provisional application No. 62/538,556, filed
(Continued)

(51) Int. Cl.
*H04W 56/00* (2009.01)
*H04L 27/26* (2006.01)
(Continued)

(52) U.S. Cl.
CPC ...... *H04L 27/2613* (2013.01); *H04J 13/0029* (2013.01); *H04L 1/0061* (2013.01);
(Continued)

(58) Field of Classification Search
CPC ............. H04L 27/2613; H04L 13/0029; H04L 1/0061; H04L 5/0051; H04L 5/10; H04W 76/11; H04W 56/001
See application file for complete search history.

(56) References Cited

U.S. PATENT DOCUMENTS

| 2014/0233494 A1* | 8/2014 | Sorrentino | H04L 27/2613 370/329 |
| 2015/0029968 A1* | 1/2015 | Park | H04W 72/044 370/329 |

(Continued)

FOREIGN PATENT DOCUMENTS

| WO | WO2013125844 A1 | 8/2013 |
| WO | WO2013139042 A1 | 9/2013 |
| WO | WO2014115960 A1 | 7/2014 |

OTHER PUBLICATIONS

Supplementary Extended European Search Report dated Apr. 16, 2021 for EP Application No. EP 18 838 448.1.
(Continued)

*Primary Examiner* — Sai Ming Chan
(74) *Attorney, Agent, or Firm* — Eschweiler & Potashnik, LLC

(57) ABSTRACT

A reference signal sequence to modulate the demodulation reference signal for the Physical Broadcast Channel in New Radio standard is disclosed. Formulas are proposed for calculating the initialization value for the RS sequence generator so as to accord with the characteristics of New Radio.

20 Claims, 18 Drawing Sheets

Related U.S. Application Data on Jul. 28, 2017, provisional application No. 62/537,615, filed on Jul. 27, 2017.

(51) Int. Cl.
```
H04W 76/11    (2018.01)
H04J 13/00    (2011.01)
H04L 1/00     (2006.01)
H04L 5/00     (2006.01)
H04L 5/10     (2006.01)
```
(52) U.S. Cl.
CPC .............. *H04L 5/0051* (2013.01); *H04L 5/10* (2013.01); *H04W 56/001* (2013.01); *H04W 76/11* (2018.02)

(56) References Cited

U.S. PATENT DOCUMENTS

2015/0103800 A1  4/2015  Seo et al.
2018/0220426 A1* 8/2018  Rico Alvarino .... H04W 72/042

OTHER PUBLICATIONS

Intel: "Discussion on DMRS Sequence for NR PBCH", 3GPP Draft; R1-1711943 Discussion on DMRS Sequence for PBCH, 3rd Generation Partnership Project (3GPP), Mobile Competence Centre; 650, Route Des Lucioles; F-06921 Sophia-Antipolis Cedex; France, vol. RAN WG1, No. Qingdoao, P.R. China; Jun. 27, 2017-Jun. 30, 2017; Jul. 1, 2017; http://www.3gp.org/ftp/tsg_ran/WG1_RL1/TSGR1_AH/NR_AH_1706/Docs/.

Intel Corporation: "DMRS Sequence for NR PBCH", 3GPP Draft; R1-1710507 Intel PBCH DMRS, 3rd Generation Partnership Project (3GPP), Mobile Competence Centre; 650, Route Des Lucioles; F-06921 Sophia-Antipolis Cedex France, vol. RAN WG1, No. Qingdao, P.R. China; Jun. 27, 2017-Jun. 30, 2017; Jun. 17, 2017.

International Search Report dated Oct. 18, 2018 for International Application No. PCT/US2018/043823.

International Preliminary Report on Patentability dated Jan. 28, 2020 for International Application No. PCT/US2018/043823.

ITL, "DMRS Sequence Design for NR-PBCH", R1-1711353, 3GPP TSG RAN WG1 Meeting #89, Qingdao, P.R. China, Jun. 17, 2017.

NTT Docomo, Inc., "Discussion on Sequence Design of DMRS for NR-PBCH", R1-1711062, 3GPP TSG RAN WG1 NR Ad-Hoc#2, Qingdao, P.R. China, Jun. 17, 2017.

LG Electronics, "Discussion on DMRS Design for NR-PBCH", R1-1710264, 3GPP TSG RAN WG1 Meeting NR#2, Qingdao, P.R. China, Jun. 17, 2017.

* cited by examiner

100

400

500

600

1000A

1100

1200

1500

DEMODULATION REFERENCE SIGNAL FOR PHYSICAL BROADCAST CHANNEL IN NEW RADIO

CROSS-REFERENCE TO RELATED APPLICATIONS

This application is a National Phase entry application of International Patent Application No. PCT/US2018/043823 filed Jul. 26, 2018, which claims priority to is a continuation of and claims priority to U.S. Provisional Patent Applications No. 62/537,615, filed Jul. 27, 2017, 62/538,556, filed on Jul. 28, 2017, and 62/566,720, filed on Oct. 2, 2017, all of which are incorporated herein by reference in their entirety.

TECHNICAL FIELD

This application relates to DeModulation Reference Signals (DMRS) for the Physical Broadcast CHannel (PBCH) in New Radio (NR) and, more particularly, to issues associated with modulating the DMRS.

BACKGROUND

The Evolved Packet Core (EPC) is the core network of advanced mobile communication systems. The EPC allows different radio access technologies (RATs) to operate in an integrated manner. These radio access technologies include first generation wireless Local Area Networks (LANs), second generation (2G) systems, such as Global System for Mobile communication, or GSM, third generation (3G) systems, such as the Universal Mobile Telecommunication System (UMTS), and fourth generation (4G) systems, such as Long Term Evolution (LTE). LTE continues to evolve (LTE-Advanced, LTE-A) and many new features are referred to as fifth generation (5G) technology, also known as New Radio (NR).

Under LTE and NR, a User Equipment (UE) connects to the EPC over the LTE access network known as E-UTRAN (short for Evolved UMTS Terrestrial Radio Access Network) and communicates with a base station known as the Evolved NodeB (eNB), which may physically consist of multiple base stations and/or radio heads. The EPC is a packet-switched network in which the Internet Protocol is used for transport services. The EPC is part of the 3$^{rd}$ Generation Partnership Project (3GPP) specification.

In 3GPP, both downlink and uplink transmissions employ an Orthogonal Frequency Division Multiplexing (OFDM) transmission scheme. Within OFDM, transmissions may employ either Frequency Division Duplex (FDD) or Time Division Duplex (TDD) modes of operation and may use different Orthogonal Frequency Division Multiple Access (OFDMA) technology in the downlink and Single Carrier Frequency Division Multiple Access (SC-FDMA) technology in the uplink. Both FDD and TDD transmissions are described in terms of a radio frame having subframes. Once synchronization between the eNB and the UE has been established, known reference signals (RS), of which there are several types, are inserted into the transmitted signal structure, in other words, along the radio frame at predefined locations in the subframe.

Mobile communication has evolved significantly from early voice systems to today's highly sophisticated integrated communication platform. The next generation wireless communication system, 5G, or new radio (NR), will provide access to information and sharing of data anywhere and anytime by various users and applications. NR is expected to be a unified network/system that targets to meet different and sometimes conflicting performance dimensions and services. Such diverse multi-dimensional specifications are driven by different services and applications. In general, NR will evolve based on the 3GPP LTE Advanced with additional potential new Radio Access Technologies (RATs) to promote better, simple, and seamless wireless connectivity solutions. NR is designed to deliver fast and rich content and services to connected wireless entitles.

Pseudo-random noise (PN) sequences are made up of 1s and 0s that are supposed to be random. A PN sequence generator may comprise linear feedback shift registers (LSFR) to generate the PN sequences. Scrambling codes used in LTE and NR are based on Gold codes, which are obtained by combining two PN sequences and performing modulo-2 addition or performing an exclusive OR (XOR) operation on them. The resulting scrambling codes have many properties, such as cross-correlation, and are utilized for different operations under 3GPP.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a reference signal sequence to modulate the demodulation reference signal for the Physical Broadcast Channel in New Radio standard is disclosed. Formulas are proposed for calculating the initialization value for the RS sequence generator so as to accord with the characteristics of New Radio. Additionally, several other proposals related to PBCH-DMRS are disclosed.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. In other instances, well-known structures, materials, or operations are not shown or described in detail to avoid obscuring aspects of the disclosure. The following detailed description is, therefore, not to be construed in a limiting sense, as the scope of the subject matter is defined by the claims.

Introductory FIGS. 1-8 provide context for the PBCH-DMRS method described herein, which is introduced in FIG. 9 and further described and illustrated in FIGS. 10-15, below.

Figure 1:
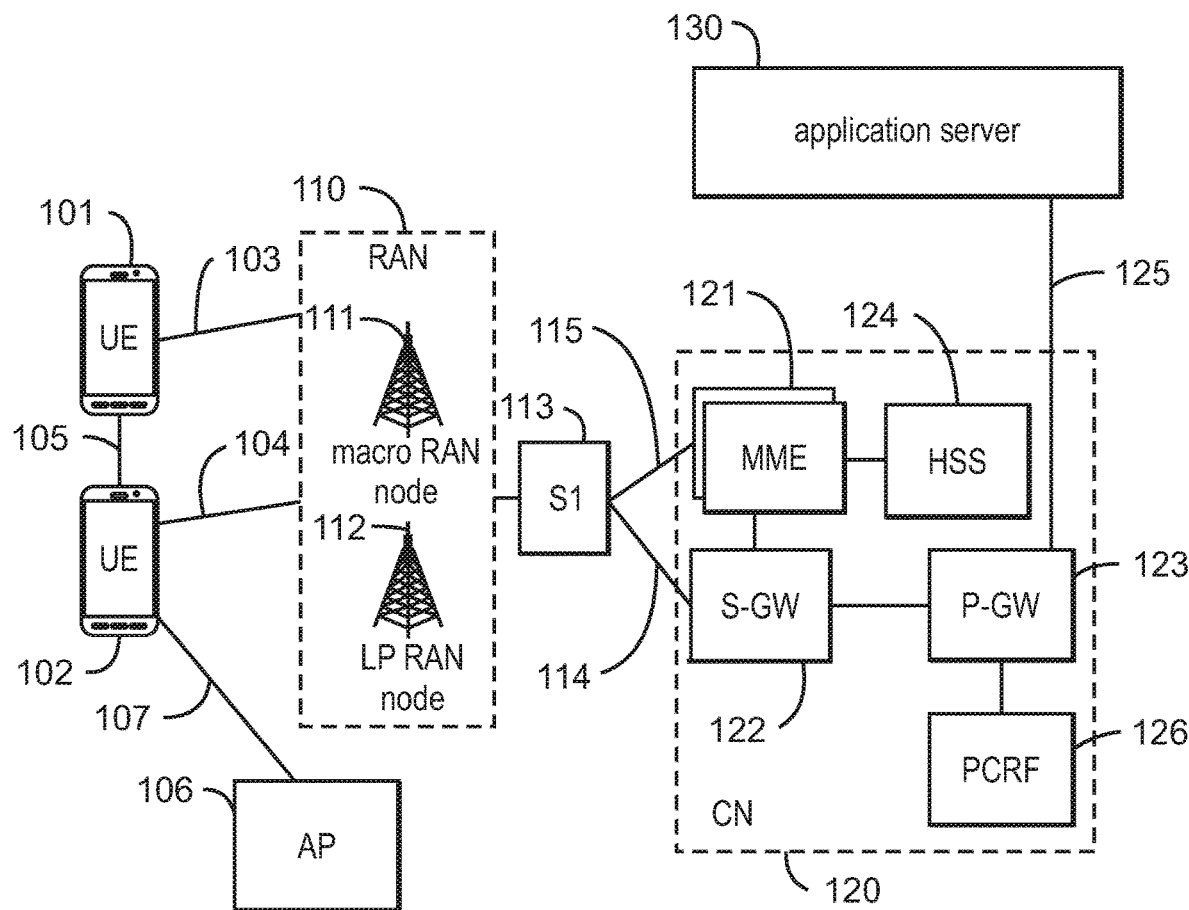
FIG. 1 illustrates an architecture of a system of a network, in accordance with some embodiments.

FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110 the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
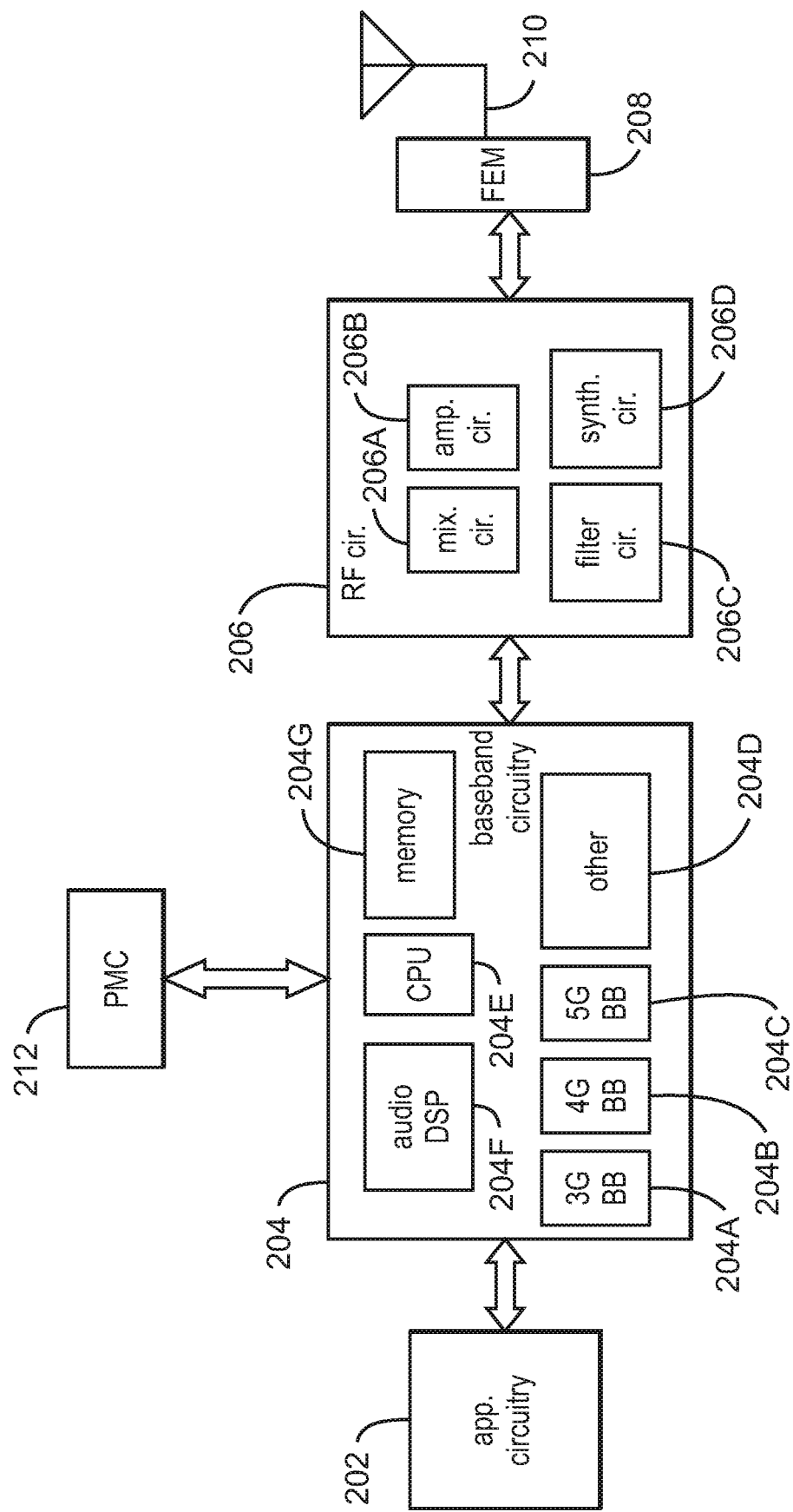
FIG. 2 illustrates example components of a device, in accordance with some embodiments.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206a, amplifier circuitry 206b and filter circuitry 206c. In some embodiments, the transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c.

In some embodiments, the mixer circuitry 206a of the receive signal path and the mixer circuitry 206a of the transmit signal path may include two or more mixers and may be arranged for quadrature downconversion and upconversion, respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other embodiments, the PMC 2 12 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
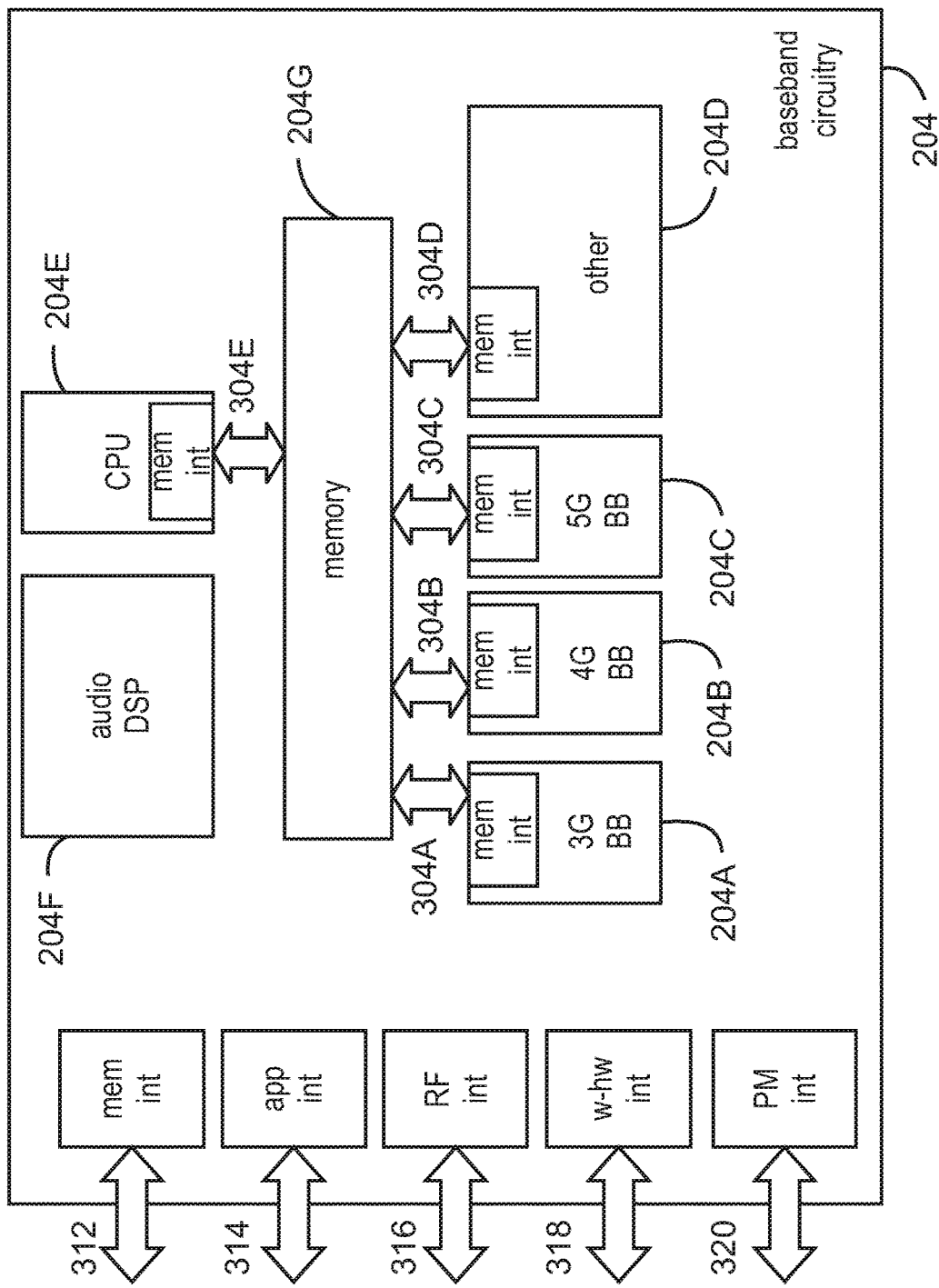
FIG. 3 illustrates example interfaces of baseband circuitry, in accordance with some embodiments.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
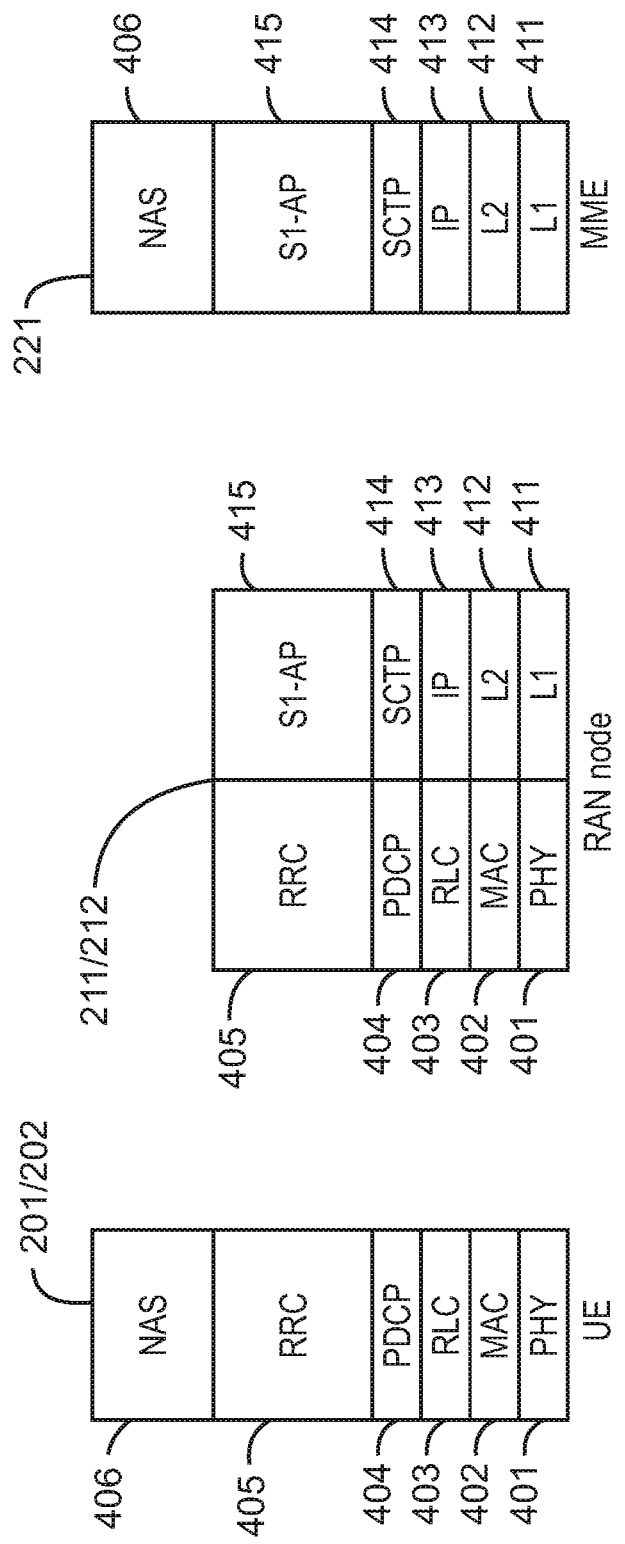
FIG. 4 is an illustration of a control plane protocol stack, in accordance with some embodiments.

FIG. 4 is an illustration of a control plane protocol stack in accordance with some embodiments. In this embodiment, a control plane 400 is shown as a communications protocol stack between the UE 101 (or alternatively, the UE 102), the RAN node 111 (or alternatively, the RAN node 112), and the MME 121.

The PHY layer 401 may transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 402 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 403 may operate in a plurality of modes of operation, including: Transparent Mode (TM), Unacknowledged Mode (UM), and Acknowledged Mode (AM). The RLC layer 403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 401, the MAC layer 402, the RLC layer 403, the PDCP layer 404, and the RRC layer 405.

The non-access stratum (NAS) protocols 406 form the highest stratum of the control plane between the UE 101 and the MME 121. The NAS protocols 406 support the mobility of the UE 101 and the session management procedures to establish and maintain IP connectivity between the UE 101 and the P-GW 123.

The S1 Application Protocol (S1-AP) layer 415 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 414 may ensure reliable delivery of signaling messages between the RAN node 111 and the MME 121 based, in part, on the IP protocol, supported by the IP layer 413. The L2 layer 412 and the L1 layer 411 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 411, the L2 layer 412, the IP layer 413, the SCTP layer 414, and the S1-AP layer 415.

Figure 5:
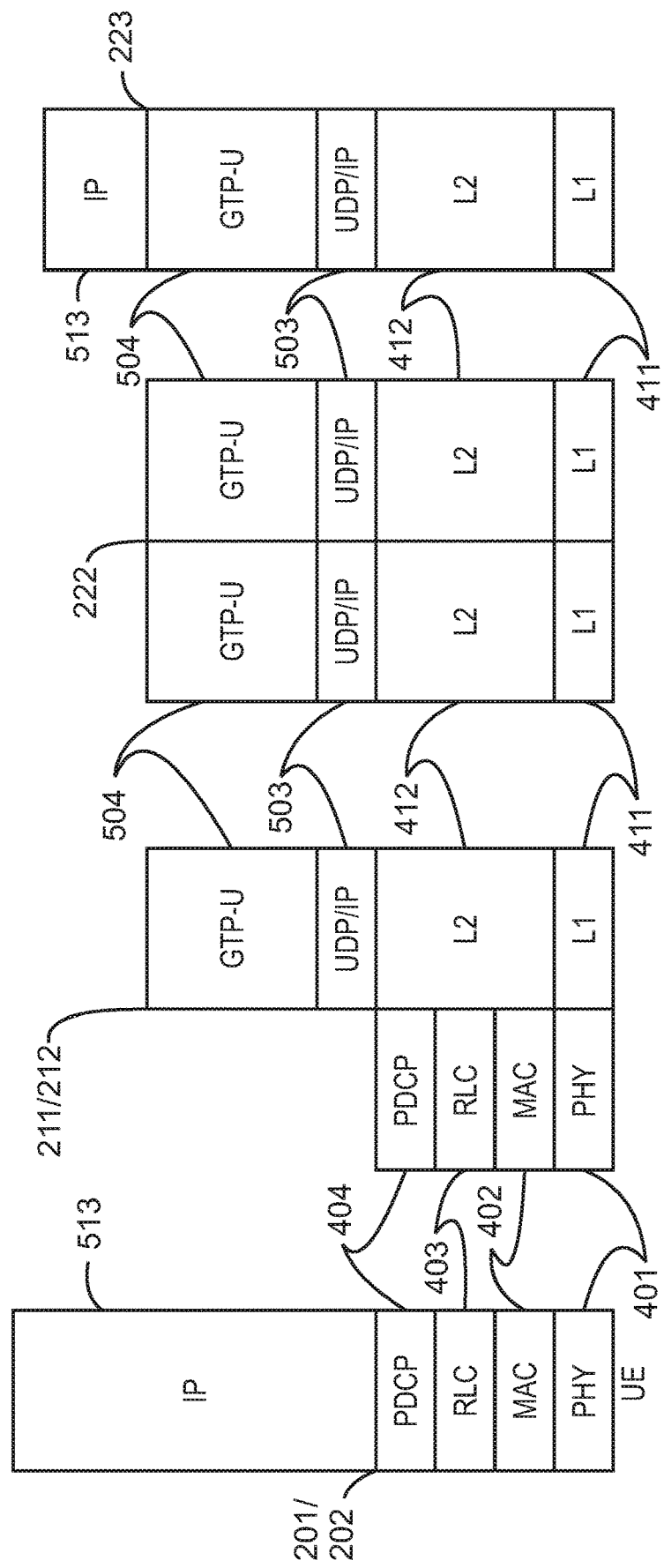
FIG. 5 is an illustration of a user plane protocol stack, in accordance with some embodiments.

FIG. 5 is an illustration of a user plane protocol stack in accordance with some embodiments. In this embodiment, a user plane 500 is shown as a communications protocol stack between the UE 101 (or alternatively, the UE 102), the RAN node 111 (or alternatively, the RAN node 112), the S-GW 122, and the P-GW 123. The user plane 500 may utilize at least some of the same protocol layers as the control plane 400. For example, the UE 101 and the RAN node 111 may utilize a Uu interface (e.g., an LTE-Uu interface) to exchange user plane data via a protocol stack comprising the PHY layer 401, the MAC layer 402, the RLC layer 403, the PDCP layer 404.

The General Packet Radio Service (GPRS) Tunneling Protocol for the user plane (GTP-U) layer 504 may be used for carrying user data within the GPRS core network and between the radio access network and the core network. The user data transported can be packets in any of IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 411, the L2 layer 412, the UDP/IP layer 503, and the GTP-U layer 504. The S-GW 122 and the P-GW 123 may utilize an S5/S8a interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the P-GW 123.

Figure 6:
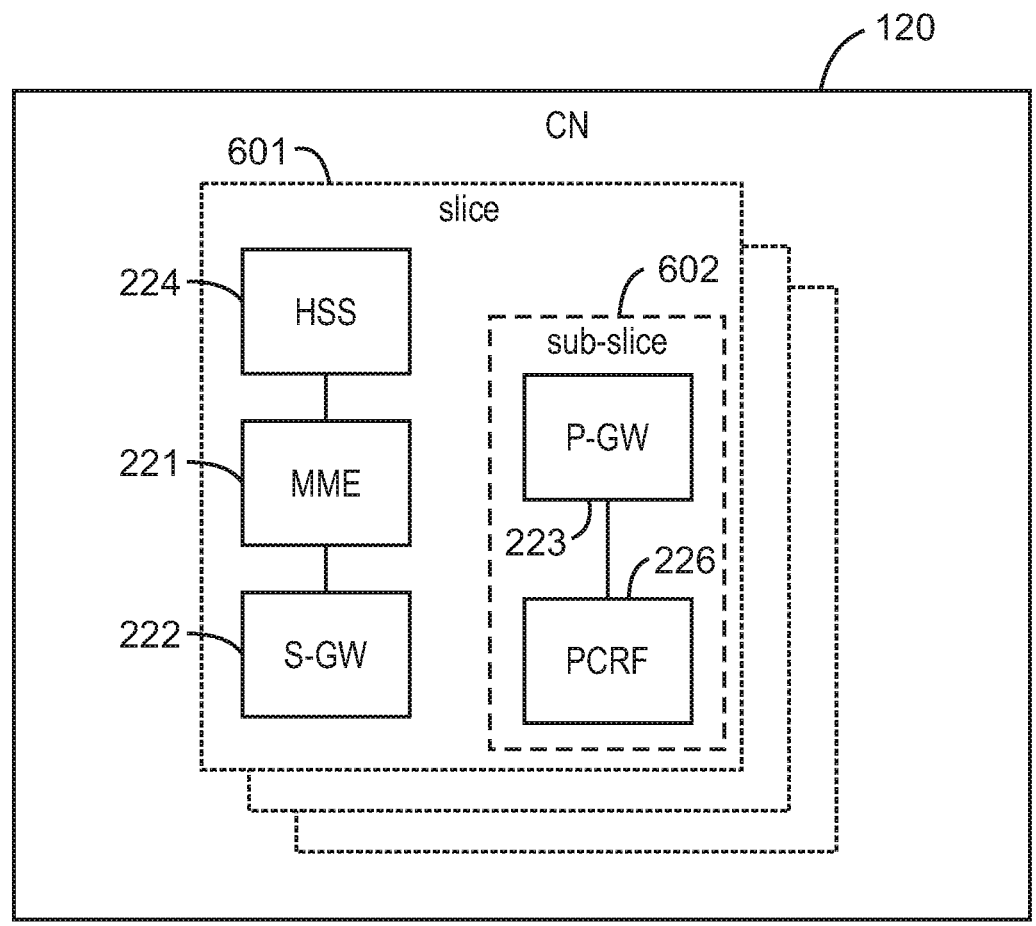
FIG. 6 illustrates components of a core network, in accordance with some embodiments.

FIG. 6 illustrates components of a core network in accordance with some embodiments. The components of the CN 120 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 120 may be referred to as a network slice 601. A logical instantiation of a portion of the CN 120 may be referred to as a network sub-slice 602 (e.g., the network sub-slice 602 is shown to include the PGW 123 and the PCRF 126).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 7:
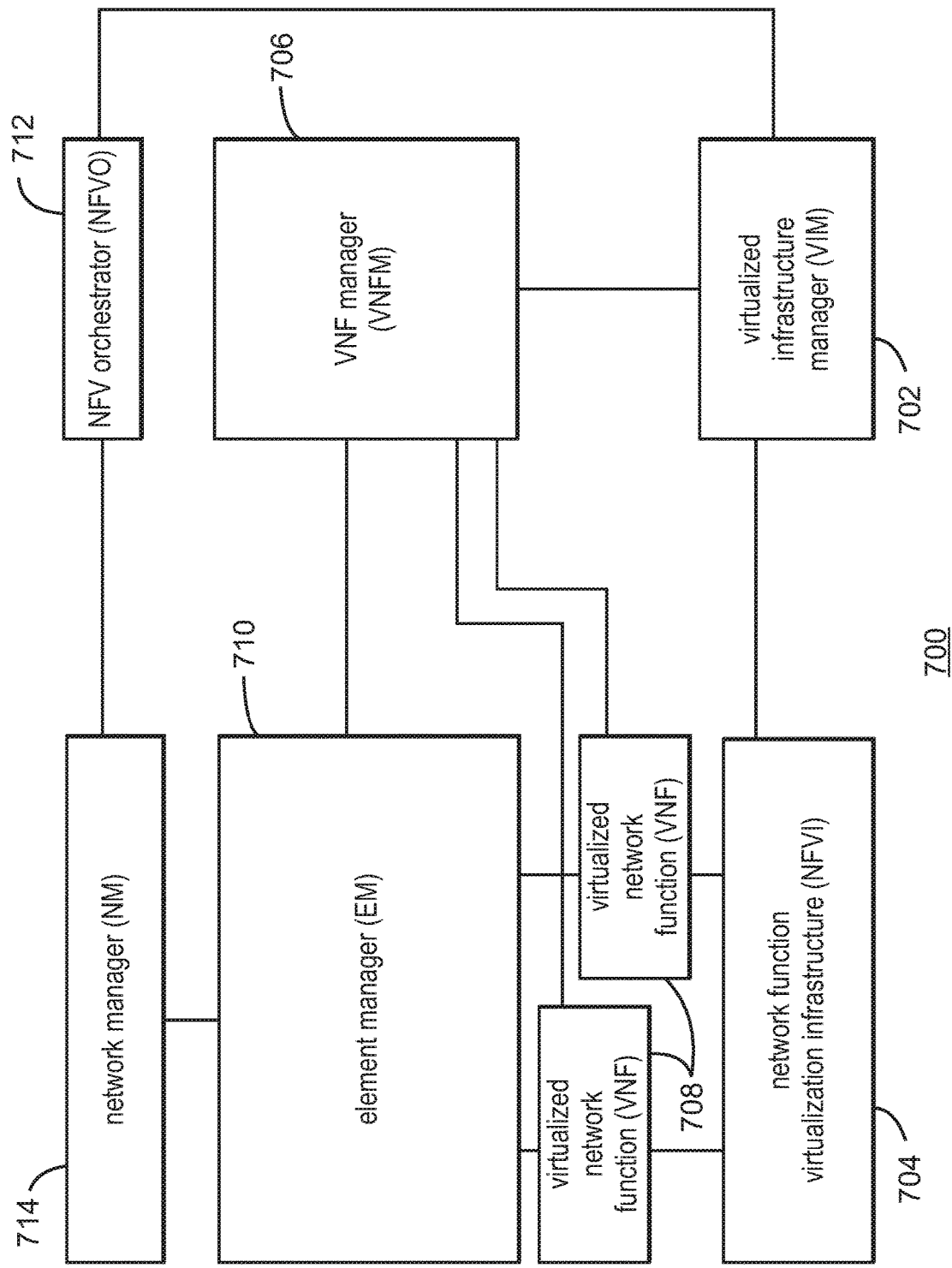
FIG. 7 is a block diagram illustrating components of a system to support NFV, in accordance with some embodiments.

FIG. 7 is a block diagram illustrating components, according to some example embodiments, of a system 700 to support NFV. The system 700 is illustrated as including a virtualized infrastructure manager (VIM) 702, a network function virtualization infrastructure (NFVI) 704, a VNF manager (VNFM) 706, virtualized network functions (VNFs) 708, an element manager (EM) 710, an NFV Orchestrator (NFVO) 712, and a network manager (NM) 714.

The VIM 702 manages the resources of the NFVI 704. The NFVI 704 can include physical or virtual resources and applications (including hypervisors) used to execute the system 700. The VIM 702 may manage the life cycle of virtual resources with the NFVI 704 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 706 may manage the VNFs 708. The VNFs 708 may be used to execute EPC components/functions. The VNFM 706 may manage the life cycle of the VNFs 708 and track performance, fault and security of the virtual aspects of VNFs 708. The EM 710 may track the performance, fault and security of the functional aspects of VNFs 708. The tracking data from the VNFM 706 and the EM 710 may comprise, for example, performance measurement (PM) data used by the VIM 702 or the NFVI 704. Both the VNFM 706 and the EM 710 can scale up/down the quantity of VNFs of the system 700.

The NFVO 712 may coordinate, authorize, release and engage resources of the NFVI 704 in order to provide the requested service (e.g., to execute an EPC function, component, or slice). The NM 714 may provide a package of end-user functions with the responsibility for the management of a network, which may include network elements with VNFs, non-virtualized network functions, or both (management of the VNFs may occur via the EM 710).

Figure 8:
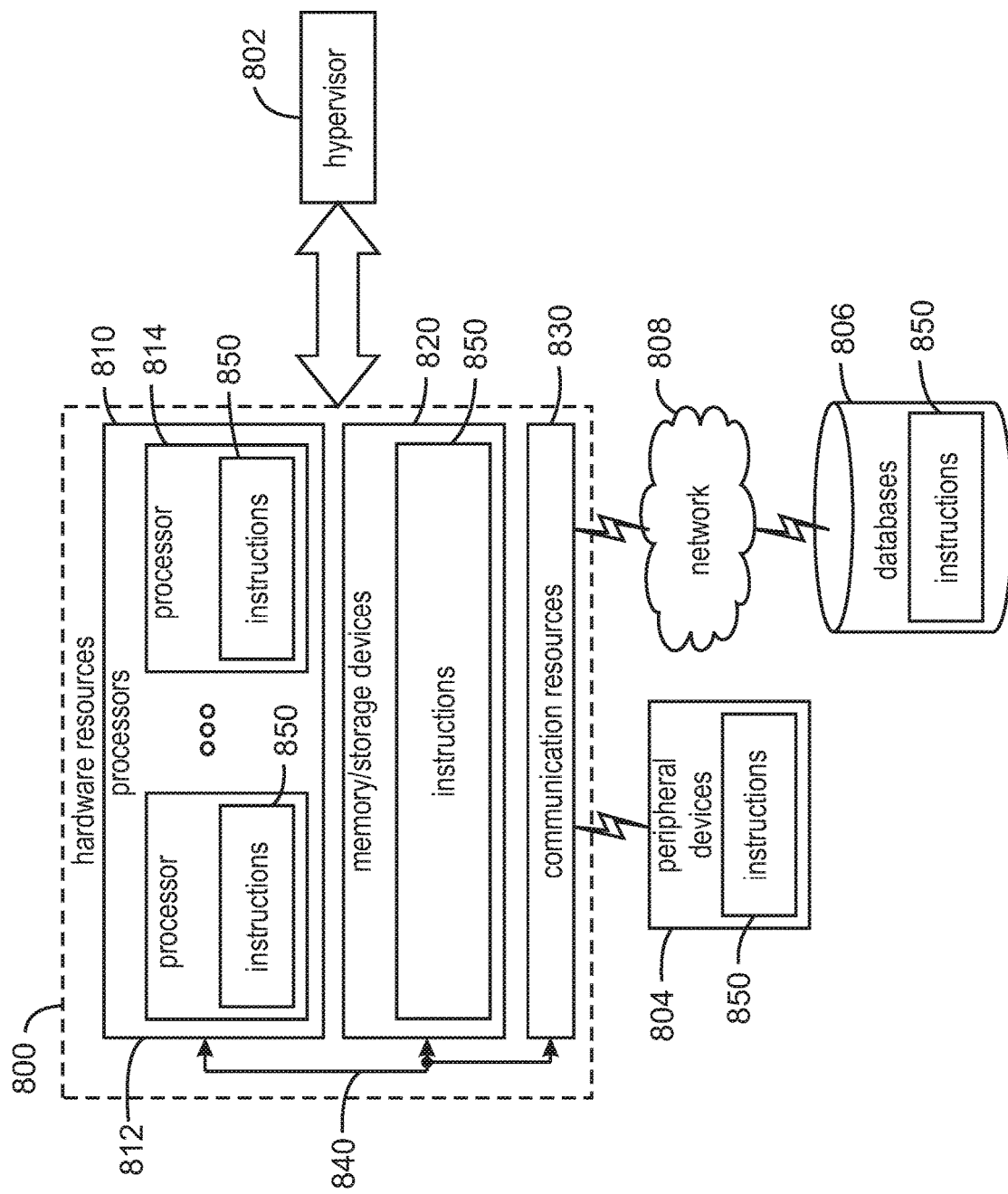
FIG. 8 is a block diagram illustrating components able to read instructions from a machine-readable or computer-readable medium (e.g., a non-transitory machine-readable storage medium) and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

Figure 9:
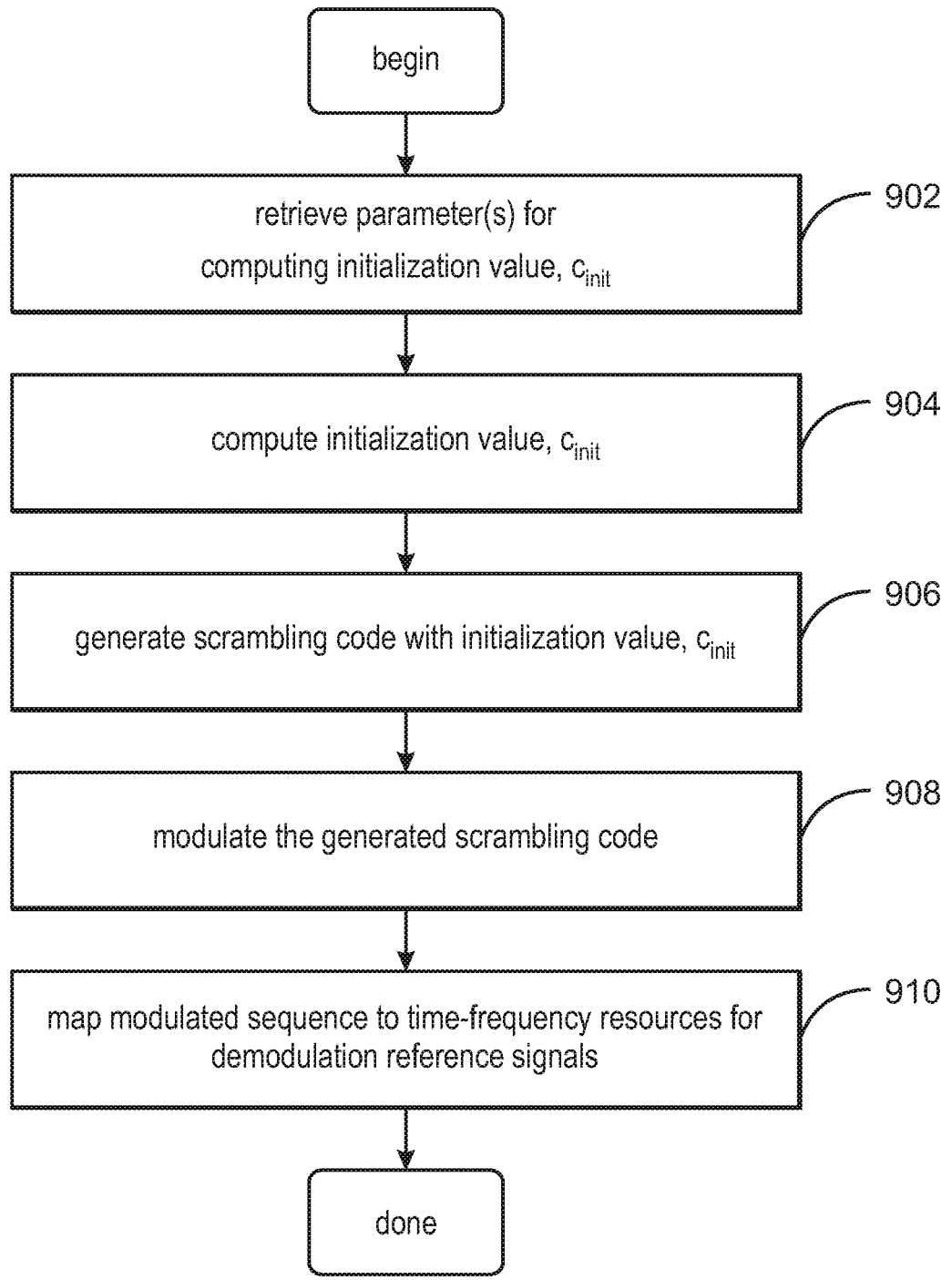
FIG. 9 is a simplified block diagram of a method for generating DMRS for PBCH in New Radio, in accordance with some embodiments.

FIG. 9 is a process flow diagram 900 for generating DMRS for PBCH in New Radio, according to some embodiments. The PBCH-DMRS method 900 may be implemented as part of a UE, such as the UE 101, or in a gNB such as the macro RAN node 111 of the RAN 110 operating in a cellular environment such as the system 100 (FIG. 1). The DMRS-PBCH method 900 encompasses several different aspects of generating the DMRS, such as increasing the width (order) of an initialization value, known herein as $c_{init}$, the motivation of which is described herein.

The process flow 900 commences by retrieving, such as by a baseband processor of the UE or gNB, one or more parameters for computing the initialization value, $c_{init}$ (block 902). The one or more parameters may be stored in a memory, such as the memory 304G of FIG. 3. The initialization value is then computed (block 904) and, from the computed $c_{init}$, a scrambling code is generated (block 906). The generated scrambling code is modulated (block 908) and mapped to time-frequency resources for DMRS (block 910). The mapped DMRS may be sent to an RF interface such as illustrated in FIG. 3.

In addition to the process flow 900, the DMRS-PBCH method 900 proposes several equations herein using a higher order initialization value for New Radio. The method 900 also encompasses proposed methodologies for extracting the reference signal from a long baseline sequence as well as generating the reference signal without knowledge of the available system bandwidth.

Further, the DMRS-PBCH method 900 proposes several pairs of generating polynomials that can be used to generate a higher order initialization value. The method 900 also proposes an initialization value using the time index of a synchronization signal (SS) block as a parameter, also pertinent for New Radio. The method 900 proposes time first and frequency first mapping of DMRS 116 and the randomization of the initialization value using a hashing function. The method 900 also enables fast-forwarding the pre-shift parameter in calculating the initialization value to limit cross-correlation. The motivation for the various features of the method 900, as well as implementation details, are described below.

New Radio (NR) is distinguishable from the Long-Term Evolution (LTE) standard in many ways. For LTE, the subcarrier spacing is 15 kHz. For NR, the subcarrier spacing is scalable, according to parameter, µ, with subcarrier spacing given by $2^{\mu}*15$ kHz, with µ of 0, . . . , 4, allowing for subcarrier spacing of 15, 30, 60, 120, and 240 kHz, respectively. NR also allows for the multiplexing of multiple subcarrier spacings in both the frequency and time domains.

Figure 10A:
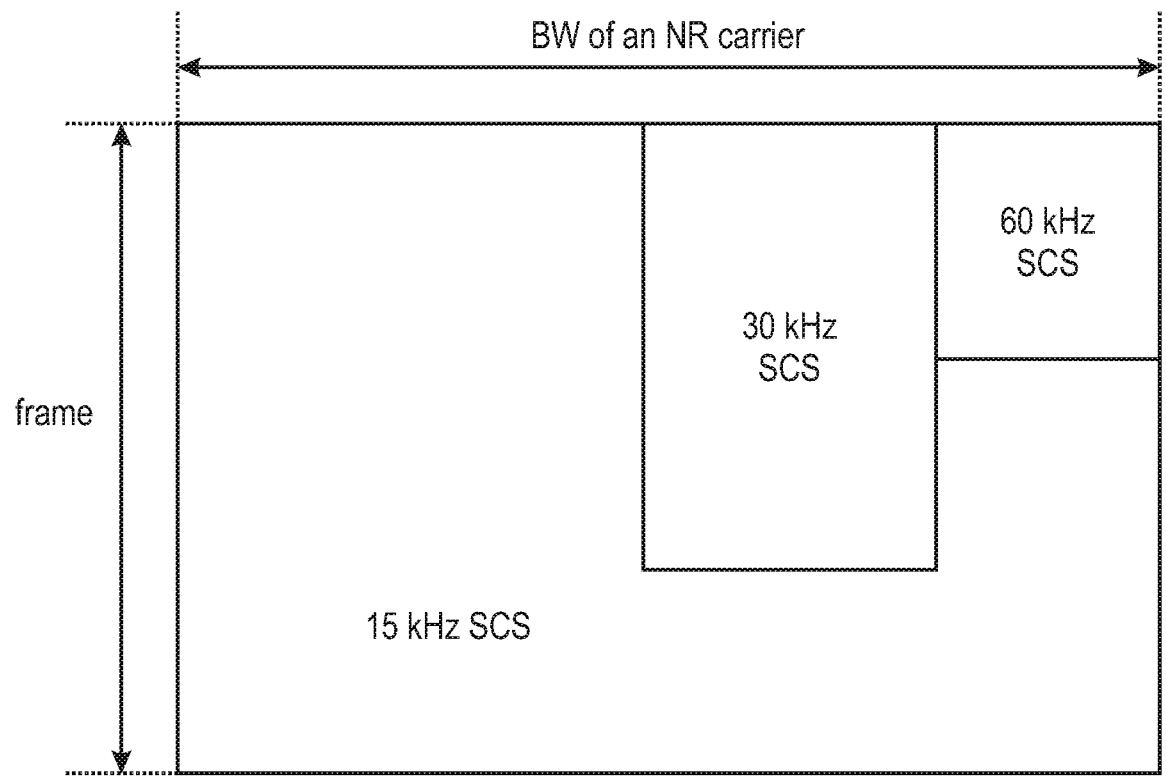
FIGS. 10A and 10B illustrate examples illustrating how subcarrier spacing works under New Radio, in accordance with some embodiments.
Figure 10B:
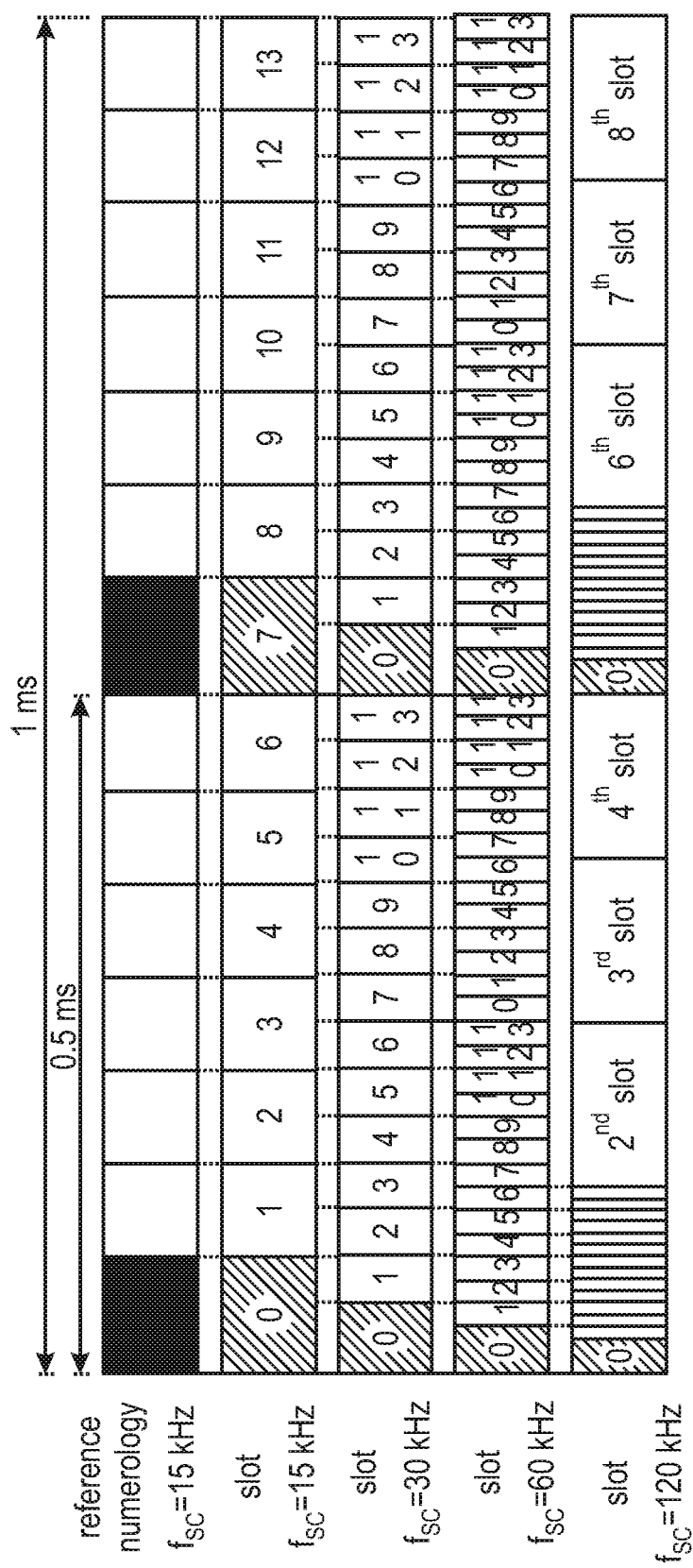

FIGS. 10A and 10B provide example configurations under NR. FIG. 10A shows the variable subcarrier spacing from the perspective of the network. Subcarrier spacings of 15 kHz, 30 kHz, and 60 kHz simultaneously occupy a single radio frame. FIG. 10B also illustrates how the width of a slot varies according to the subcarrier spacing. Each symbol length (including CP) of 15 kHz equals the sum of the corresponding $2^{\mu}$ symbols at the carrier frequency. Thus, 15 kHz transmissions have 14 symbols per subframe with 1 ms duration while 30 kHz transmissions have 28 symbols per subframe, 60 kHz transmissions have 56 symbols per subframe, and 120 kHz transmissions have 112 symbols per subframe. The number of slots in a subframe changes with the subcarrier spacing: slot length=1 ms/$2^{\mu}$. At 15 kHz, the number of slots in a 1 ms subframe is 1, at 30 kHz, the number of slots is 2, at 60 kHz, the number of slots is 4; at 120 kHz, the number of slots is 8.

The flexibility of NR allows for high reliability use cases as well as low latency use cases. For example, data transmissions below 6 GHz use 15, 30, or 60 kHz subcarrier spacing, while data transmissions above 6 GHz use 60 or 120 kHz subcarrier spacing.

Reference Signals

Downlink reference signals (RS) are used in LTE for different purposes and consist of multiple reference symbols occupying specific resource elements (RE) within the radio frame which are transmitted along with the data. Terminals (UEs) use Cell-specific Reference Signals (CRS) for channel estimation for coherent demodulation of downlink physical channels. CRS are also used for obtaining Channel State Information (CSI), for cell selection and for handover.

Under LTE-A, reference signals are defined to split up the channel estimation and CSI acquisition operations. DeModulation Reference Signals (DMRS) are used for channel estimation and CSI reference signals (CSI-RS) are used to acquire channel state information. DMRS are higher-density on the radio frame than CSI-RS and are transmitted when there is data to transmit, while CSI-RS occur with less frequency than DMRS. CSI-RS are more efficient than CRS for deriving CSI for multiple network nodes and antenna ports.

Also known as UE-specific reference signals, DMRS are used for channel estimation for coherent demodulation of one or more physical channels, for example, the Physical Downlink Shared Channel (PDSCH) and the Physical Downlink Control Channel (PDCCH). A predefined DMRS is designated for each UE, enabling the UE to perform channel estimation. DMRS are transmitted within the resource block specifically assigned for PDSCH/PDCCH transmission to a given terminal.

Long Gold Code

In LTE, the reference signals (RSs), such as, for example, DMRS, CRS, CSI-RS, Positioning RS (PRS) and others, are based on the sequences which are extracted from a long Gold code. The long Gold code is generated using the two following primitive polynomials of order 31:

$$g_0(x)=x^{31}+x^3+1 \quad (1)$$

$$g_1(x)=x^{31}+x^3+x^2+x+1 \quad (2)$$

$$c(n)=(x_0(n+N_C)+x_1(n+N_C)) \bmod 2 \quad (3)$$

Here, c(n) is the Gold code (n=0, 1, MPN−1, where MPN is the length of the output sequence) and $x_0$ and $x_1$ are the two constituent m-sequences obtained using the polynomials $g_0(x)$ and $g_1(x)$, respectively, that is:

$$x_0(n+31)=(x_0(n+3)+x_0(n)) \bmod 2; \quad (4)$$

$$x_1(n+31)=(x_1(n+3)+x_1(n+2)+x_1(n+1)+x_1(n)) \bmod 2 \quad (5)$$

where $N_C$ is the initial offset. In LTE, the initial offset $N_C$ equals 1600.

The initial states of the linear feedback shift registers (LFSRs) generating the constituent m-sequences are defined as follows:

$$x_0(0)=1, x_0(k)=0, k=1,2, \ldots, 30 \quad (6)$$

$$x_1(k)=\lfloor c_{init}/2^k \rfloor \bmod 2, k=0,1, \ldots, 30 \quad (7)$$

Here, $c_{init}$ is the initialization value which may include parameters such as the cell identity (Cell-ID, or $N_{ID}^{cell}$), OFDM symbol index, and so on. The m-sequences are a specific type of Pseudo-Random Noise, or PN, sequences. In the equations above, (●) mod 2 corresponds to the modulo-2 operation and ⌊●⌋ corresponds to the floor operation, that is, obtaining the nearest integer lower than the argument.

Initialization Value Calculation for PBCH-DMRS in NR

A disadvantage of DMRS generation existing in LTE is that the initialization value, $c_{init}$, is limited by 31 bits. This may restrict some system parameters from being used in the initialization of the generating LFSR. One such parameter is the time index of NR synchronization signal (SS) block, which, in NR, is to be transmitted using the DMRS.

For the initialization of DMRS for the Physical Broadcast Channel (PBCH-DMRS) sequence generator in NR, the following alternatives are proposed. In one embodiment:

$$c_{init}=2^{12}N_{ID}^{cell}+580 \cdot (b \bmod 8) \text{(Alternative 1)} \quad (8)$$

where b=0, 1, . . . , 63 is the time index of the synchronization signal (SS) block. In another embodiment:

$$c_{init}=2^{12}(I_{SSB}+1)(\lfloor N_{ID}^{cell}/4 \rfloor)+2^6(I_{SSB}+1) \text{(Alternative 2)} \quad (9)$$

where $I_{SSB}$=0, 1, . . . , 7 is the value obtained from the three least significant bits (LSBs) of the SS block time index. The b mod 8 portion of the equation in Alternative 1 is mathematically equivalent to the SS block index, $I_{SSB}$. In some embodiments, the Cell ID, $N_{ID}^{cell}$, can be from 0 to 1007 and the SS block index, $I_{SSB}$, can be from 0 to 7.

One disadvantage of using Alternative 1 (Equation 8) is that the Cell ID, $N_{ID}^{cell}$, and SS block index, $I_{SSB}$, are combined in a linear way. In other words, $N_{ID}^{cell}$ and $I_{SSB}$ occupy dedicated non-overlapping bit positions in the binary representation of the initialization value, $c_{init}$. In the non-linear combining, bits that are dedicated to the Cell ID, $N_{ID}^{cell}$, but not the SS block index, $I_{SSB}$ and vice-versa, do not exist.

To provide a non-linear combination of parameters, $N_{ID}^{cell}$ and $I_{SSB}$, their multiplication can be used, as in Alternative 2 (Equation 9). The linear approach to the calculation of $c_{init}$ does not allow randomization of interference across different SS blocks, making it stationary in the time domain.

However, Alternative 2 (Equation 9) presents a disadvantage. For every four consecutive Cell ID ($N_{ID}^{cell}$) values, Alternative 2 provides the same initialization, $c_{init}$, for a given SS block because of the term $\lfloor N_{ID}^{cell}/4 \rfloor$. DMRS sequence transmitted by different cells that may have the same term, $\lfloor N_{ID}^{cell}/4 \rfloor$, can avoid DMRS sequence collision by mapping the PBCH DMRS sequence with a shift in the frequency domain, given by $v_{shift}=N_{ID}^{cell} \bmod 4$.

Figure 11:
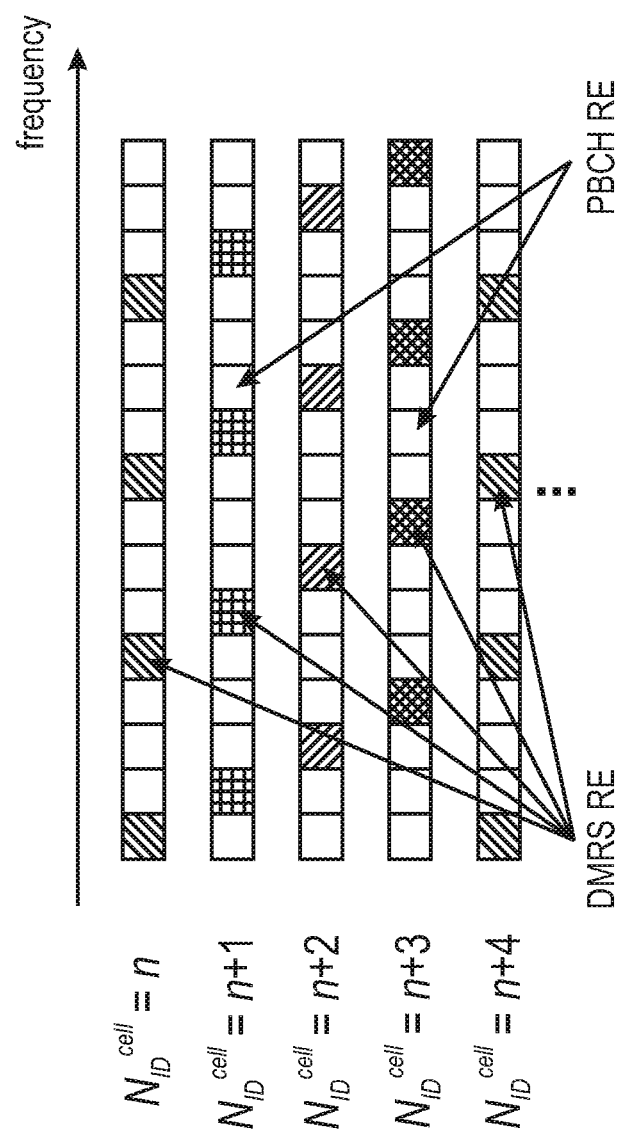
FIG. 11 is a simplified diagram illustrating mapping of PBCH DMRS for different cell IDs, in accordance with some embodiments.

The same PBCH DMRS of the consecutive four Cell ID values are separated in the frequency domain. FIG. 11 illustrates PBCH DMRS mapping for five cells (UEs) with consecutive cell ID values, illustrating this principle. The PBCH RE are broadcast data and the DMRS RE are reference signals embedded and transmitted along with the broadcast data. A first cell (UE) having Cell ID of n shows DMRS REs in the $1^{st}$, $5^{th}$, $9^{th}$, and $13^{th}$ RE positions; a second UE having Cell ID of n+1 shows DMRS REs in the $2^{nd}$, $6^{th}$, $10^{th}$, and $14^{th}$ RE positions; a third UE having Cell ID of n+2 shows DMRS REs in the $3^{rd}$, $7^{th}$, $11^{th}$ and $15^{th}$ RE positions; and a fourth UE having Cell ID of n+3 shows DMRS REs in the $4^{th}$, $8^{th}$, $12^{th}$, and $16^{th}$ RE positions. The DMRS positions eventually repeat, such that a fifth UE having Cell ID of n+4 would have an arrangement of DMRS that looks like the UE having Cell ID of n. Even if DMRS sequences belonging to different cell are mapped to different frequency shifts they can potentially cause interference from the UE perspective if there is a frequency offset at the UE receiver. In such case, the same PBCH DMRS that belong to different cell can interfere with each other, resulting in degradation of channel estimation for PBCH.

In consideration of the above, the PBCH-DMRS method 900 enables a DMRS sequence design for NR PBCH that includes the time index of the SS block, $I_{SSB}$. The resulting initialization value, $c_{init}$, is thus based on the nonlinear combining of bits related to the Cell ID, $N_{ID}^{cell}$, and bits related to the SS block time index, $I_{SSB}$. Moreover, the bits of the Cell ID, $N_{ID}^{cell}$, are used in the $c_{init}$ calculation are split into two components, where one component is combined with bits related to the SS block time index, $I_{SSB}$, based on the nonlinear combining of the bits.

Further, the PBCH-DMRS method 900 increases the number of bits for the initialization value, $c_{init}$, in some embodiments. This implies an increase of the number of registers in the LFSRs generating the constituent m-sequences in the Gold code. Mathematically, this is achieved by increasing the order of generating polynomials, $g_0(x)$ and $g_1(x)$. Therefore, generating polynomials of an order higher than is available in LTE are proposed herein, in some embodiments.

In some embodiments, for initialization value calculation, N bits of the cell ID value $N_{ID}^{cell}$ are used, where the cell ID comprises N bits for integer N. This is different from Alternative 2 (equation 9), above where, because of the term, $\lfloor N_{ID}^{cell}/4 \rfloor$, results in a portion of the bits that represent term, $N_{ID}^{cell}$, in binary. DMRS sequences are different for different cells, even where DMRS is mapped to adjacent OFDM subcarriers. This provides additional robustness against residual frequency offset during channel estimation, in some embodiments.

In contrast to Alternative 1 (Equation 8), in some embodiments, the cell ID bits re split into two parts, $\lfloor N_{ID}^{cell}/4 \rfloor$ and $N_{ID}^{cell}$ mod 4, with one part, $\lfloor N_{ID}^{cell}/4 \rfloor$, being used for nonlinear combining with SS block index to better randomize interference on DMRS REs across SS blocks within the SS burst set. Another part of the cell ID bits, $N_{ID}^{cell}$ mod 4, is separated from the first part within the initialization value.

In some embodiments, the PBCH-DMRS method 900 allows a third alternative (Alternative 3), with the resulting initialization value $c_{init}$ being obtained as follows:

$$c_{init}=2^5(I_{SSB}+1)\lfloor N_{ID}^{cell}/4 \rfloor + 4I_{SSB}+N_{ID}^{cell} \bmod 4 \quad (10)$$

For coherent detection of DMRS, the real part of the cross-correlation value of two DMRS matters. In some embodiments, cumulative distribution function (CDF) curves are provided for a complete set of combinations of cell ID values and SS block time index for Alternative 1 (Equation 8), Alternative 2 (Equation 9) and Alternative 3 (Equation 10) in FIG. 12 and in Table 1. Alternative 3 (Equation 10) corresponds to the proposed $c_{init}$ value calculation.

Figure 12:
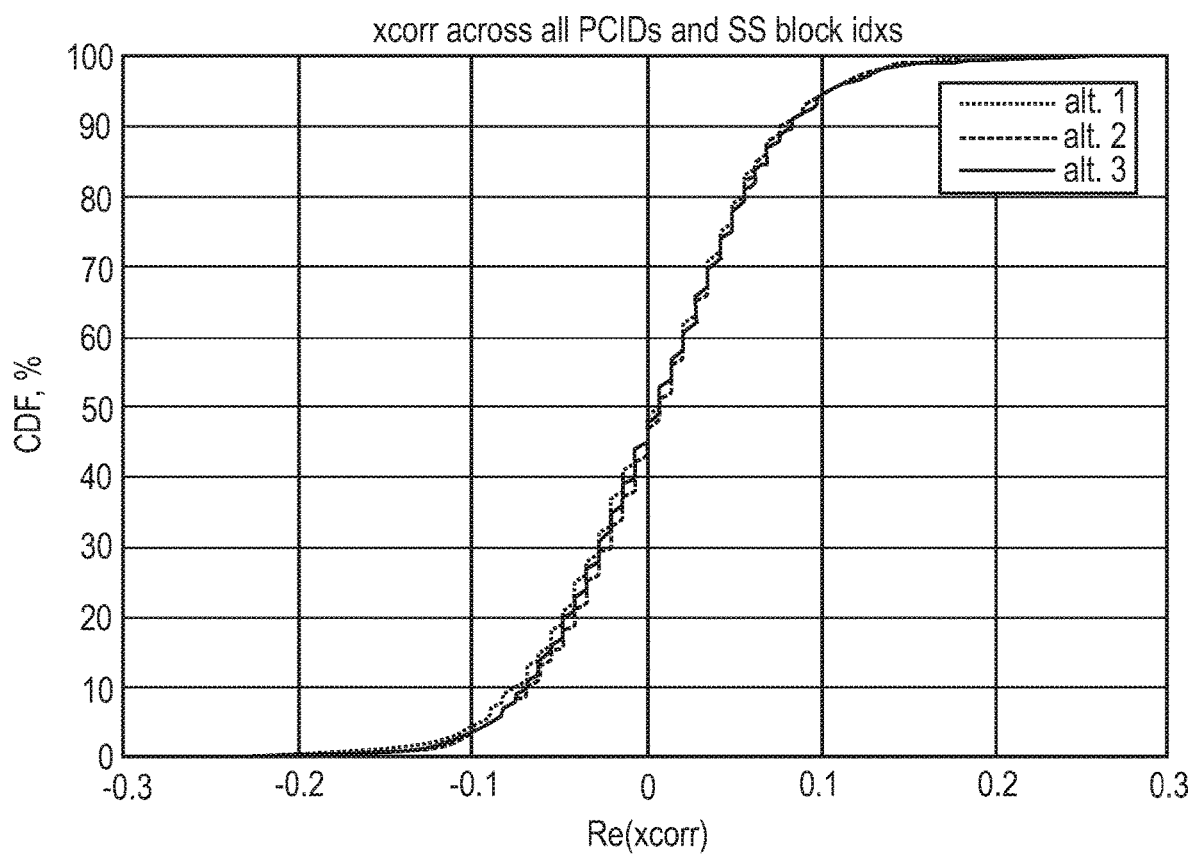
FIG. 12 is a cumulative distribution function graph of cross-correlation values across different combinations of the cell ID and SS block index parameters used by the PBCH-DMRS method of FIG. 1, in accordance with some embodiments.

FIG. 12 is a cumulative distribution function graph of cross-correlation values across different combinations of the cell ID and SS block index parameters, according to some embodiments. It can be observed that Alternative 3 shows comparable results with Alternatives 1 and 2, providing a cross-correlation real value that is approximately between the corresponding values of Alternative 1 and Alternative 2.

TABLE 1

Summary of cross-correlation real values comparison

| Alternatives | 50%-tile Linear | 95%-tile Linear | Max Linear | dB |
|---|---|---|---|---|
| Alt.1 | 0.0069 | 0.1042 | 0.1806 | −7.4328 |
| Alt.2 | 0.0069 | 0.1042 | 0.2569 | −5.9024 |
| Alt.3 | 0.0069 | 0.1042 | 0.2500 | −6.0206 |

In some embodiments, other variations of Alternative 3 are as follows:

$$c_{init}=2^{12}(I_{SSB}+1)(\lfloor N_{ID}^{cell}/4 \rfloor+1)+4I_{SSB}+N_{ID}^{cell} \bmod 4 \quad (11)$$

$$c_{init}=2^{12}(I_{SSB}+1)(\lfloor N_{ID}^{cell}/4 \rfloor+1)+2^6((N_{ID}^{cell} \bmod 4)+1) \quad (12)$$

$$c_{init}=2^{12}(I_{SSB}+1)(\lfloor N_{ID}^{cell}/4 \rfloor+1)+2^6(I_{SSB}=(N_{ID}^{cell} \bmod 4)+1) \quad (13)$$

In some embodiments, the variations listed above have similar cross correlation profile and provide good performance for DMRS.

System Bandwidth as Parameter for Reference Signals Under NR

There are two mechanisms of extracting the modulating RS sequence from the long baseline sequence (which is actually based on the Gold code, c(n)). These include truncation of the long baseline sequence to obtain the RS sequence and extraction of the RS sequence based on the allocated bandwidth. The two mechanisms are illustrated in FIGS. 13A and 13B.

The base station (known as a gNB in NR) generates the RS sequence and can actually service multiple users (UEs) simultaneously. So, for example, the gNB can service one UE in one part of the bandwidth and another UE in another part of the bandwidth, and transmit the RS sequences simultaneously to respective UEs. For example, if a first UE has been allocated a 1 MHz bandwidth and a second UE has been allocated a 2 MHz bandwidth, the gNB will generate a sequence that corresponds to the 1 MHz bandwidth of the first UE, and generate a second sequence that corresponds to the 2 MHz bandwidth of the second UE. The generation of the RS sequence for each UE is thus a function of the allocated bandwidth of each UE.

Figure 13A:
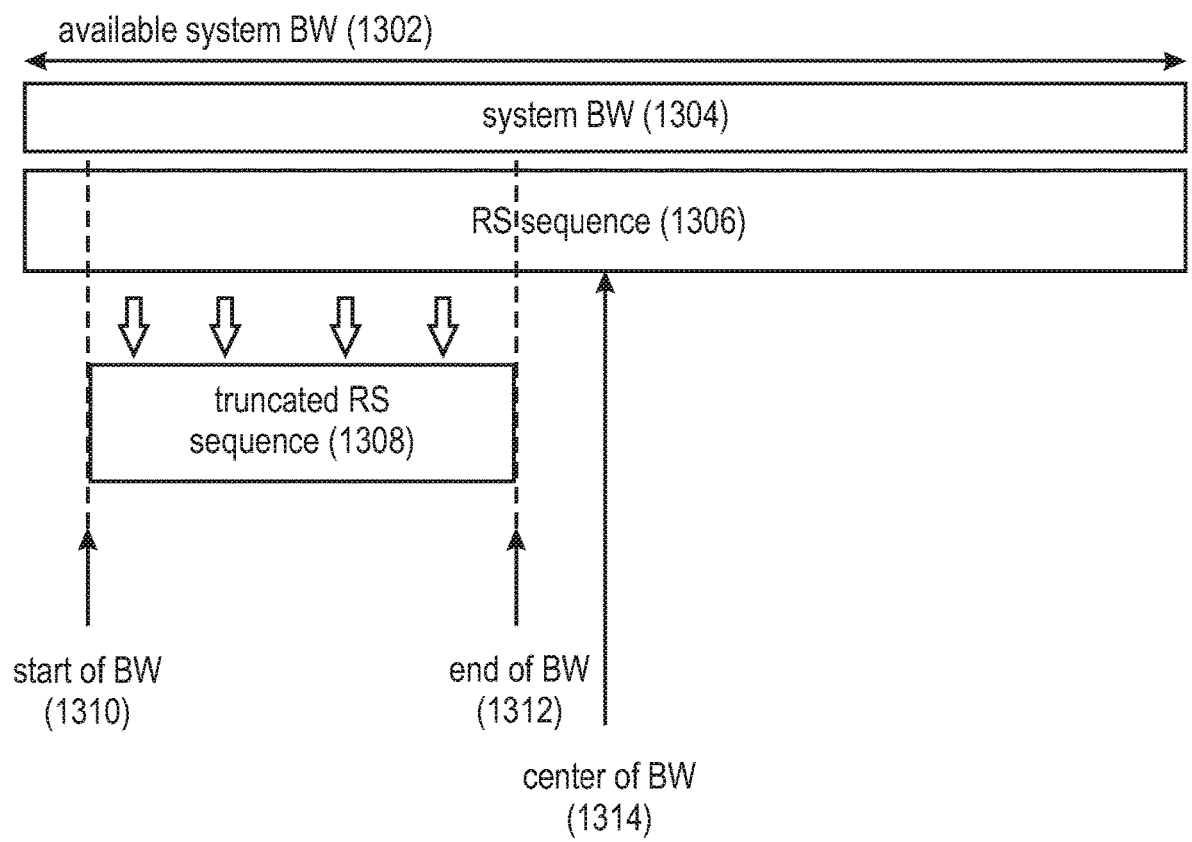
FIGS. 13A and 13B illustrate two mechanisms of extracting the modulating RS sequence from long baseline sequence, in accordance with some embodiments.

FIG. 13A illustrates a first mechanism for allocating the RS sequences, a truncation 1300A of the long baseline sequence in the frequency domain, according to some embodiments. A system bandwidth 1304, having a center location 1314, is disposed within an available bandwidth limit. The gNB generates an RS sequence 1306 using a common RS sequence generator and stores the result in memory. The length of the baseline RS sequence 1306 is based on the available system bandwidth 1302, and, for each UE, the bandwidth of the truncated RS sequence 1308 is defined by starting 1310 and ending 1312 frequency positions. Other parameters used in RS sequence generation include the central frequency location, shown as center of BW 1314. The mechanism of FIG. 13A is used during CRS/CSI-RS sequence generation.

Figure 13B:
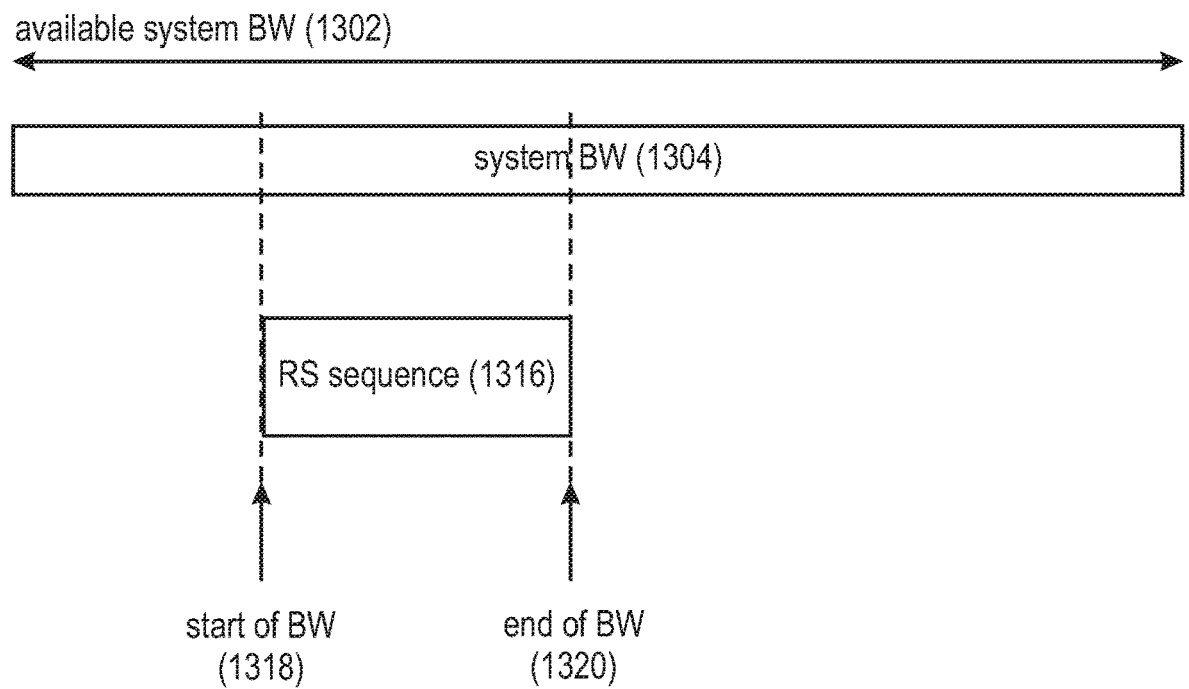

FIG. 13B illustrates extraction 1300B of the RS sequence 1316 based on allocated bandwidth, according to some embodiments. Again, the RS sequence 1316 is generated by the gNB with a common RS sequence generator. However, in this example, no baseline RS sequence is generated. Instead, the knowledge of the starting 1318 and ending 1320 frequency positions of the UE's allocated bandwidth, rather than the available system bandwidth, is used to generate the RS sequence 516 for the UE. The mechanism of FIG. 13B is used during LTE Release-8 DMRS generation.

Thus, for some LTE operations, knowledge of the available system bandwidth is used to extract the RS sequence from the baseline sequence and in others the system bandwidth is not part of the calculus. In LTE, the available system bandwidth is 20 MHz. New Radio is more flexible than LTE, allowing the available system bandwidth to vary according to the use case. To enable forward compatibility in NR, the RS sequence generation procedure 110 of the PBCH-DMRS method 900 avoids using the available system bandwidth or system bandwidth limit as a parameter, in some embodiments.

Figure 14:
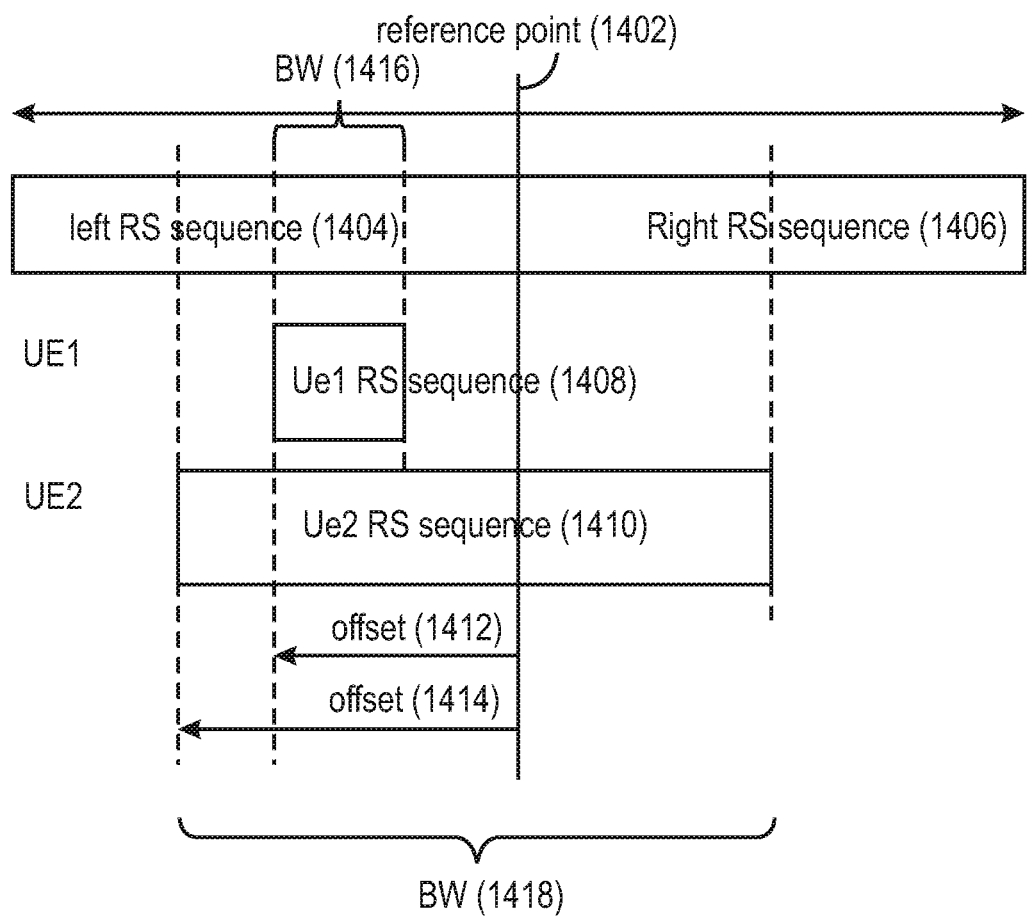
FIG. 14 illustrates a novel RS sequence generation method used by the PBCH-DMRS method of FIG. 9, in accordance with some embodiments.

FIG. 14 illustrates a novel RS sequence generation method 1400 used by the PBCH-DMRS method 900 for NR, according to some embodiments. Using the LTE principles of FIGS. 13A and 13B, the RS sequence generation 1400 is achieved by centrally expanding from a reference point without knowledge of the available system bandwidth. Like in FIG. 13A, a baseline RS sequence is generated by the gNB from the Gold code and stored in a memory. This time, however, the baseline RS sequence consists of a left RS sequence 1402 and a right RS sequence 1404. The left RS sequence RS 1402 is generated left-to-right while the right RS sequence 1404 is generated right-to-left, in some embodiments. In other embodiments, the left baseline RS sequences 1404 is a mirror symmetric sequence of the right baseline RS sequence 606. The RS sequence generation 1400 results in RS sequences 1408 and 1410, for UEs 1 and 2, respectively.

As in FIG. 13B, using a reference point 1402 in the frequency domain, the offset of its RS bandwidth from the reference point and the RS bandwidth value, the gNB is able to generate the resulting RS sequence without knowing the available system bandwidth. Thus, to generate the RS sequence 1408 for UE1, the offset 1412 from the reference point 1402 and the UE bandwidth value 1416 are used. To generate the RS sequence 1410 for UE2, the offset 1414 from the reference point and the UE bandwidth value 1418 are used.

One possible realization of the RS generating mechanism of FIG. 14 involves the reciprocal Gold code and is called a circularly expanding RS sequence generation. In this case, an RS sequence with a certain periodicity, N, is defined (that is, generated based on the Gold code output from the length-31 LFSR). The RS sequence first is mapped on the right from the reference point, i.e., from index 0 to the end of the right edge of the UE operating bandwidth. Then, the same RS sequence is reversely mapped on the left such that it starts from the left edge of the bandwidth and ends at N−1. The reversed RS sequence to the left from the reference point is also based on the Gold code (reciprocal Gold code) and generated from the constituent m-sequences, v(n) and v(3n), corresponding to polynomials, $f_0(x)$ and $f_1(x)$, respectively, and u(n) and u(3n), corresponding to polynomials, $g_0(x)$ and $g_1(x)$, respectively, such as the following:

$$f_0(x) = x^{31} + x^{28} + 1 \rightarrow v[n] \quad (14)$$

$$f_1(x) = x^{31} + x^{30} + x^{29} + x^{28} + 1 \rightarrow v[3n] \quad (15)$$

$$g_0(x) = x^{31} + x^3 + 1 \rightarrow u[n] \quad (16)$$

$$g_1(x) = x^{31} + x^3 + x^2 + x + 1 \rightarrow u[3n] \quad (17)$$

$$c'[n] = (v[n] + v[3n]) \bmod 2 \quad (18)$$

$$c[n] = (u[n] + u[3n]) \bmod 2 \quad (19)$$

and the left RS sequence 1404 being obtained using c[L2]~c[N−1], and the right RS sequence 1406 being obtained using c[0]~c[L1].

Generating Higher-Order Initialization Values for NR

As explained above, there are motivations for having a wider initialization value, $c_{init}$, that is, one with more bits, in NR. A wider $c_{init}$ is associated with a larger LSFR length, and a larger number of shift registers. This means that higher order generating polynomials, $g_0(x)$ and $g_1(x)$ are used. Table 2 is a list of pairs of primitive polynomials used by the PBCH-DMRS method 900 to generate constituent m-sequences of the Gold code, according to some embodiments.

TABLE 2

List of primitive polynomial pairs to construct the Gold code

| LFSR length (polynomials' order) | | primitive polynomials |
|---|---|---|
| 33 | u(n) | $g_0(x) = x^{33} + x^{13} + 1$ |
| | u(5n) | $g_1(x) = x^{33} + x^{29} + x^{17} + x^{13} + 1$ |
| 35 | u(n) | $g_0(x) = x^{35} + x^2 + 1$ |
| | u(3n) | $g_1(x) = x^{35} + x^{24} + x^{13} + x^2 + 1$ |
| 35 | u(n) | $g_0(x) = x^{35} + x^2 + 1$ |
| | u(5n) | $g_1(x) = x^{35} + x^{28} + x^7 + x^2 + 1$ |
| 39 | u(n) | $g_0(x) = x^{39} + x^4 + 1$ |
| | u(3n) | $g_1(x) = x^{39} + x^{26} + x^{13} + x^4 + 1$ |
| 39 | u(n) | $g_0(x) = x^{39} + x^4 + 1$ |
| | u(5n) | $g_1(x) = x^{39} + x^{32} + x^{11} + x^4 + 1$ |
| 41 | u(n) | $g_0(x) = x^{41} + x^3 + 1$ |
| | u(3n) | $g_1(x) = x^{41} + x^3 + x^2 + x^1 + 1$ |
| 47 | u(n) | $g_0(x) = x^{47} + x^5 + 1$ |
| | u(3n) | $g_1(x) = x^{47} + x^{33} + x^{19} + x^5 + 1$ |
| 49 | u(n) | $g_0(x) = x^{49} + x^9 + 1$ |
| | u(5n) | $g_1(x) = x^{49} + x^{41} + x^{17} + x^9 + 1$ |

TABLE 2-continued

List of primitive polynomial pairs to construct the Gold code

| LFSR length (polynomials' order) | | primitive polynomials |
|---|---|---|
| 53 | u(n) | $g_0(x) = x^{53} + x^{50} + x^{41} + x^{20} + 1$ |
| | u(3n) | $g_1(x) = x^{53} + x^{52} + x^{51} + x^{50} + x^{49} + x^{47} + x^{45} + x^{44} + x^{42} + x^{41} + x^{40} + x^{34} + x^{31} + x^{30} + x^{27} + x^{20} + 1$ |
| 57 | u(n) | $g_0(x) = x^{57} + x^7 + 1$ |
| | u(3n) | $g_1(x) = x^{57} + x^{38} + x^{19} + x^7 + 1$ |
| 57 | u(n) | $g_0(x) = x^{57} + x^7 + 1$ |
| | u(5n) | $g_1(x) = x^{57} + x^{47} + x^{17} + x^7 + 1$ |
| 63 | u(n) | $g_0(x) = x^{63} + x^1 + 1$ |
| | u(3n) | $g_1(x) = x^{63} + x^{42} + x^{21} + x^1 + 1$ |
| 63 | u(n) | $g_0(x) = x^{63} + x^1 + 1$ |
| | u(5n) | $g_1(x) = x^{63} + x^{38} + x^{13} + x^1 + 1$ |
| 65 | u(n) | $g_0(x) = x^{65} + x^{18} + 1$ |
| | u(5n) | $g_1(x) = x^{65} + x^{52} + x^{18} + x^{13} + 1$ |
| 71 | u(n) | $g_0(x) = x^{71} + x^6 + 1$ |
| | u(5n) | $g_1(x) = x^{71} + x^{58} + x^{19} + x^6 + 1$ |
| 73 | u(n) | $g_0(x) = x^{73} + x^{25} + 1$ |
| | u(3n) | $g_1(x) = x^{73} + x^{57} + x^{41} + x^{25} + 1$ |
| 79 | u(n) | $g_0(x) = x^{79} + x^9 + 1$ |
| | u(3n) | $g_1(x) = x^{79} + x^9 + x^6 + x^3 + 1$ |
| 79 | u(n) | $g_0(x) = x^{79} + x^9 + 1$ |
| | u(5n) | $g_1(x) = x^{79} + x^{65} + x^{23} + x^9 + 1$ |
| 81 | u(n) | $g_0(x) = x^{81} + x^4 + 1$ |
| | u(3n) | $g_1(x) = x^{81} + x^{54} + x^{27} + x^4 + 1$ |
| 87 | u(n) | $g_0(x) = x^{87} + x^{13} + 1$ |
| | u(3n) | $g_1(x) = x^{87} + x^{58} + x^{29} + x^{13} + 1$ |
| 89 | u(n) | $g_0(x) = x^{89} + x^{38} + 1$ |
| | u(3n) | $g_1(x) = x^{89} + x^{72} + x^{55} + x^{38} + 1$ |
| 93 | u(n) | $g_0(x) = x^{93} + x^2 + 1$ |
| | u(3n) | $g_1(x) = x^{93} + x^{62} + x^{31} + x^2 + 1$ |
| 95 | u(n) | $g_0(x) = x^{95} + x^{11} + 1$ |
| | u(3n) | $g_1(x) = x^{95} + x^{67} + x^{39} + x^{11} + 1$ |
| 95 | u(n) | $g_0(x) = x^{95} + x^{11} + 1$ |
| | u(5n) | $g_1(x) = x^{95} + x^{76} + x^{19} + x^{11} + 1$ |
| 95 | u(n) | $g_0(x) = x^{95} + x^{83} + x^{77} + x^{11} + 1$ |
| | u(5n) | $g_1(x) = x^{95} + x^{91} + x^{89} + x^{87} + x^{81} + x^{79} + x^{77} + x^{67} + x^{59} + x^{55} + x^{39} + x^{35} + x^{33} + x^{11} + 1$ |
| 97 | u(n) | $g_0(x) = x^{97} + x^6 + 1$ |
| | u(3n) | $g_1(x) = x^{97} + x^6 + x^4 + x^2 + 1$ |
| 101 | u(n) | $g_0(x) = x^{101} + x^{83} + x^{74} + x^{26} + 1$ |
| | u(3n) | $g_1(x) = x^{101} + x^{95} + x^{92} + x^{89} + x^{80} + x^{77} + x^{76} + x^{74} + x^{64} + x^{58} + x^{51} + x^{45} + x^{42} + x^{26} + 1$ |
| 103 | u(n) | $g_0(x) = x^{103} + x^9 + 1$ |
| | u(3n) | $g_1(x) = x^{103} + x^9 + x^6 + x^3 + 1$ |
| 105 | u(n) | $g_0(x) = x^{105} + x^{16} + 1$ |
| | u(3n) | $g_1(x) = x^{105} + x^{70} + x^{35} + x^{16} + 1$ |
| 105 | n(n) | $g_0(x) = x^{105} + x^{16} + 1$ |
| | u(5n) | $g_1(x) = x^{105} + x^{84} + x^{21} + x^{16} + 1$ |
| 111 | u(n) | $g_0(x) = x^{111} + x^{10} + 1$ |
| | u(3n) | $g_1(x) = x^{111} + x^{74} + x^{37} + x^{10} + 1$ |
| 118 | u(n) | $g_0(x) = x^{118} + x^{33} + 1$ |
| | n(5n) | $g_1(x) = x^{118} + x^{101} + x^{50} + x^{33} + 1$ |
| 119 | u(n) | $g_0(x) = x^{119} + x^8 + 1$ |
| | u(3n) | $g_1(x) = x^{119} + x^{82} + x^{45} + x^8 + 1$ |
| 121 | u(n) | $g_0(x) = x^{121} + x^{18} + 1$ |
| | u(3n) | $g_1(x) = x^{121} + x^{18} + x^{12} + x^6 + 1$ |
| 123 | u(n) | $g_0(x) = x^{123} + x^2 + 1$ |
| | u(3n) | $g_1(x) = x^{123} + x^{82} + x^{41} + x^2 + 1$ |
| 127 | u(n) | $g_0(x) = x^{127} + x^1 + 1$ |
| | u(3n) | $g_1(x) = x^{127} + x^{85} + x^{43} + x^1 + 1$ |

In Table 2, the notation u(qn) means that the constituent m-sequence generated using the polynomial $g_1(x)$ can be alternatively obtained by decimating the constituent m-sequence u(n) generated using the polynomial $g_0(x)$ with the decimation step q, where decimation means taking every $n^{th}$ value.

Sequence x(n), generated from a primitive polynomial of:

$$g(x) = x^N + \sum_{k=1}^{N-1} a_k x^k + 1, a_k \in \{0, 1\} \quad (20)$$

can be expressed in a recursive form:

$$x(n+N) = \left(\sum_{k=1}^{N-1} a_k \cdot x(n+k) + x(n)\right) \bmod 2, a_k \in \{0, 1\} \quad (21)$$

where n is the sequence index and N is the primitive polynomial order.

The first column in Table 2 indicates the length of the Gold code to be generated. Thus, the first generating polynomials, $g_0(x)$ and $g_1(x)$ would be used to generate a length-33 Gold code. Generating polynomials for Gold codes up to length 127 are provided in Table 2.

As larger number of bits constitute the $c_{init}$ initialization value, the equation for calculating $c_{init}$ can include a larger number of bits for parameters such as the cell ID, $N_{ID}^{cell}$, the SS block time index, $I_{SSB}$ and so on. For example, $c_{init}$ can be defined as follows:

$$c_{init} = (N_{TI}^{SS}+1)*(N_{ID}^{cell}+1)*2^{14} + (N_{TI}^{SS}+1)*2^{10} + (N_{ID}^{cell}+1) \quad (22)$$

where $N_{TI}^{SS}$ denotes the time index of SS block (which is another notation for $I_{SSB}$) and $N_{ID}^{cell}$ denotes the cell ID. Table 2 thus provides generating codes to enable the initialization value to feature more parameters of what is to be transmitted in the radio frame.

Cross-Correlation

PN sequences generated by the Gold code with initialization values that differ in a few bit positions may have high partial cross correlation. In some embodiments, to avoid high partial cross correlation, the PBCH-DMRS method 900 enables PN sequences to be fast-forwarded with a novel pre-shift parameter, $N_C$ (also known as the initial offset parameter, $N_C$, used in Equation 3, above). The pre-shift parameter is used because the initial 1s and 0s making up the PN sequences are not random enough. The pre-shift parameter addresses this, by, in essence, discarding a certain number of initial bits. For the order 31 Gold code in LTE, that number is 1600. Where higher-order Gold codes are used, the pre-shift parameter may change. FIGS. 7A and 7B are graphs illustrating partial cross-correlation of a Gold code with particular generating polynomials, according to some embodiments.

For example, the Gold code, c(n), could be fast forwarded by $N_C$ after the initial state is configured. This can be expressed as:

$$c(n)=(x_0(n+N_C)+x_1(n+N_C))\bmod 2 x_0(n+47)=(x_0(n+5)+x_0(n))\bmod 2 x_1(n+47)=(x_1(n+5)+x_1(n+4)+x_1(n+1)+x_1(n))\bmod 2 \quad (23)$$

where $N_C$ is the pre-shift parameter. The Gold code is a length-47 Gold code.

Partial cross-correlation of the Gold Code with generating polynomials of $g_0(x)=x^{47}+x^5+1$ and $g_1(x)=x^{47}+x^5+x^4+x+1$, according to some embodiments. The partial cross correlation with 18, 36, 72, and 144 resource elements (REs) modulated by the QPSK signal generated from the Gold code, c(n), results in values below 0.9, 0.7, 0.5, and 0.4, respectively, when an $N_C$ value of between 21,000 and 24,000. An $N_C$ value of 23,700 or larger provides good cross-correlation, in one embodiment. In another embodiment, an $N_C$ value of 23,830 provides good partial cross-correlation between Gold code generated with different initialization values.

As another example, the Gold code, c(n), could be fast forwarded by $N_C$ after the initial state is configured. This can be expressed as:

$$c(n)=(x_0(n+N_C)+x_1(n+N_C))\bmod 2 x_0(n+63)=(x_0(n+1)+x_0(n))\bmod 2 x_1(n+63)=(x_1(n+38)+x_1(n+13)+x_1(n+1)+x_1(n))\bmod 2 \quad (24)$$

where $N_C$ is the pre-shift parameter.

An initialization of a length-63 Gold code can be expressed as:

$$x_0(0) = 1, x_0(k) = 0, k = 1, 2, \Lambda, 62 \quad (25)$$

$$x_1(k) = \left\lfloor \frac{c_{init}}{2^k} \right\rfloor \bmod 2, k = 0, 1, \Lambda, 62$$

Partial cross correlation with 18, 36, 72, and 144 REs modulated by a QPSK signal generated from the Gold code, c(n), with generating polynomials $g0(x)=x^{63}+x+1$ and $g1(x)=x^{63}+x^{36}+x^{13}+x+1$ results in values below 0.8. From the simulation results, an $N_C$ value of between 20,000 and 24,000 provides good cross-correlation, in some embodiments. In one embodiment, an $N_C$ value of 20,750 provides good partial cross-correlation between the order-63 Gold code generated with different initialization values.

In some embodiments, the sequence generated from the length-63 Gold code is used to generate demodulation reference signals. The following is an example of a Gold code of length 63 being utilized to generate DMRS for PBCH.

DMRS for PBCH Option 1: Length-63 Gold Code

In some embodiments, the PBCH-DMRS method 900 utilizes a pseudo-random sequences defined by a length-63 Gold sequence. The output sequence, c(n), of length $M_{PN}$, where n=0, 1, . . . , $M_{PN}$−1, is defined by:

$$c(n)=(x_1(n+N_C)+x_2(n+N_C))\bmod 2 x_1(n+63)=(x_1(n+1)+x_1(n))\bmod 2 x_2(n+63)=(x_2(n+38)+x_2(n+13)+x_2(n+1)+x_2(n))\bmod 2 \quad (26)$$

where $N_C$=20750 and the first m-sequence is initialized with $x_1(0)=1, x_1(n)=0, n=1, 2, \ldots, 62$. The initialization of the second m-sequence is determined by initial value, $$c_{init} = \sum_{i=0}^{62} x_2(i) \cdot 2^i \quad (27)$$

and computed as $$x_2(i) = \left\lfloor \frac{c_{init}}{2^i} \right\rfloor \bmod 2, i = 0, 1, \Lambda, 62 \quad (28)$$

The UE-specific reference-signal sequence r(m) is QPSK modulated and is defined by:

$$r(m) = \frac{1}{\sqrt{2}}(1 - 2 \cdot c(2m)) + j\frac{1}{\sqrt{2}}(1 - 2 \cdot c(2m+1)), \quad (29)$$

$$m = 0, 1, \ldots, 6N_{RB}^{PBCH} - 1$$

where $N_{RB}^{PBCH}$=24. The r(m) equation is a mathematical expression of the modulation of the DMRS sequence into QPSK. Equation 29 is taking bits of binary sequences and mapping them to complex values (1+j and 1−j) for the QPSK modulation.

In some embodiments, the pseudo-random sequence generator is initialized with:

$$c_{init} = (N_{ID}^{SSblock}+1) \cdot (2N_{ID}^{cell}+1) \cdot 2^{10} + N_{ID}^{cell} \quad (30)$$

at the start of each synchronization signal (SS) block transmission instance, where $N_{ID}^{SSblock}$ is the value represented by the three least significant bits of the SS Block index within the SS Burst Set (which is the same as the SS block time index $I_{SSB}$) and $N_{ID}^{cell}$ is the physical cell ID. Where the SS Block index within the SS Burst Set consists of two bits, $N_{ID}^{SSblock}$ is the value represented by those two bits.

DMRS for PBCH Option 2: Length-7 Gold Code

In some embodiments, the DMRS sequence is obtained by cyclic extension of the Gold code. Different sequences correspond to different cells and SS blocks with different time index. A procedure for generating a set of DMRS sequences, each of which uniquely identifies the cell ID and SS block time index, is described below.

Figure 15:
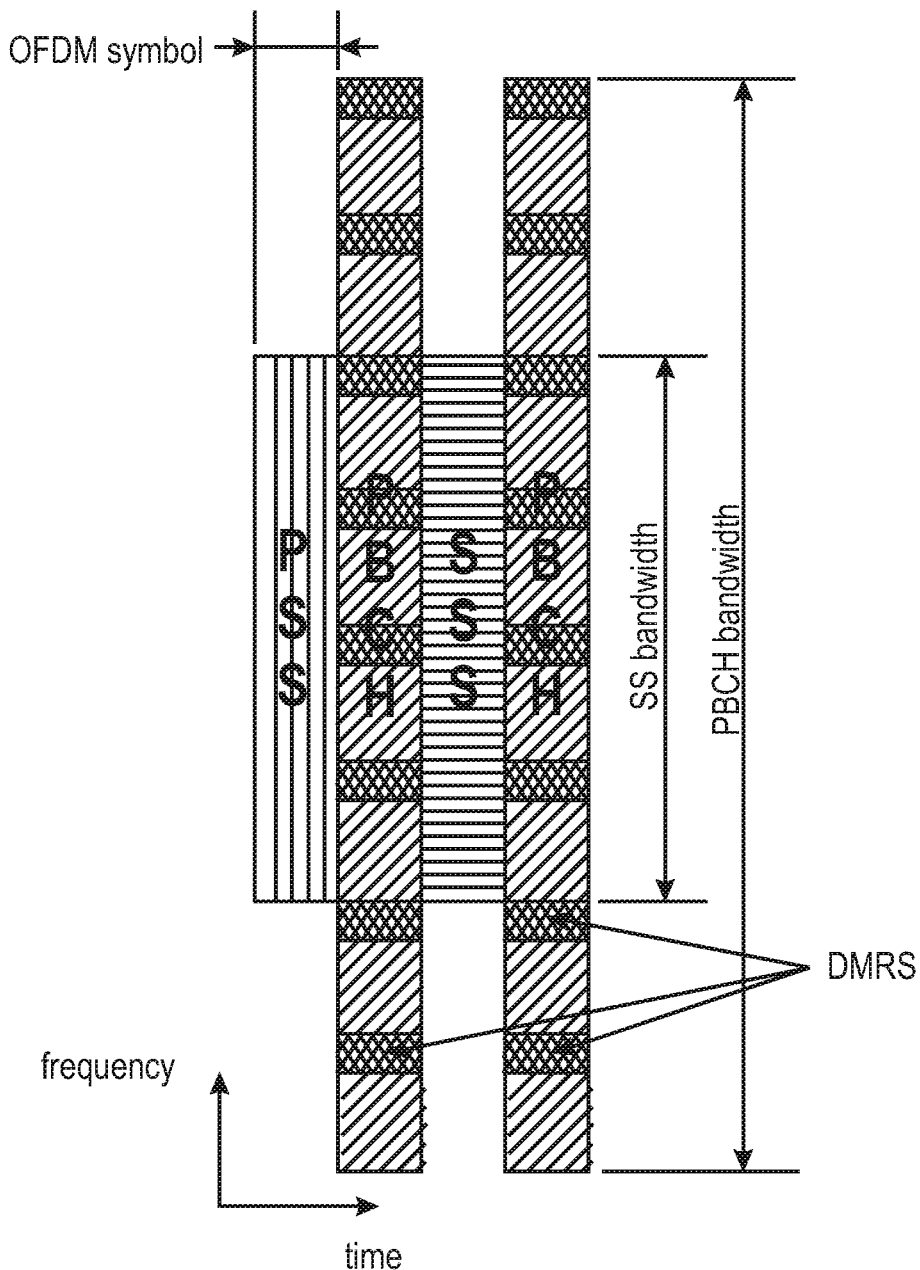
FIG. 15 is a time frequency structure of a synchronization signal block in New Radio, in accordance with some embodiments.

A time frequency structure of an SS block in NR is illustrated in FIG. 15, according to some embodiments. The Primary Synchronization Signal (PSS) occupies a first OFDM symbol while the Secondary Synchronization Signal (SSS) occupies the third OFDM symbol. In this illustration, the Physical Broadcast CHannel (PBCH) occupies the second and fourth symbol. In NR, the bandwidth of the PBCH is equal to 288 subcarriers, and the overhead of evenly distributed DMRS is ¼. Thus, there are 144 resource elements (REs) allocated for DMRS in two PBCH OFDM symbols in total.

The length of the Gold code is $2^n-1$ where n is the length of LFSR (also the order of generating polynomials $g_0(x)$ and $g_1(x)$). The nearest Gold code length less than 144 is 127 corresponding to the generating polynomials of order 7. Polynomials used to generate the Secondary Synchronization Signal under New Radio are also of order 7 and are also Gold code-based.

In some embodiments, to enable the hardware reuse between NR SSS and DMRS, the SSS generating polynomials under New Radio are reused for DMRS. The $7^{th}$ order generating polynomials are:

$$g_0(x) = x^7 + x^4 + 1 \quad (31)$$

$$g_1(x) = x^7 + x1 + 1 \quad (32)$$

To obtain the length-144 sequence for DMRS, in some embodiments, the length-127 Gold code is cyclically extended by 17 elements.

There are 1008 unique physical-layer cell identities and up to eight different values for the SS block time index. To generate a set of 8064 (1008*8) unique DMRS sequences based on the Gold code, in some embodiments, circular shifts, $m_0$ and $m_1$, are applied to the constituent m-sequences. In some embodiments, the values for $m_0$ and $m_1$ are derived from cell identity $N_{ID}^{cell}$ and SS block time index $N_{TI}^{SS}$. For example, the DMRS sequence generation procedure can be described as follows:

$$d(n) = [1 - 2x_0((n+m_0) \mod 127)][1 - 2x_1((n+m_1) \mod 127)] \quad (33)$$

$$m_0 = N_{ID}^{cell} \mod 127$$

$$m_1 = K \left\lfloor \frac{N_{ID}^{cell}}{127} \right\rfloor + N_{TI}^{SS}$$

$$0 \leq n < 144$$

where the integer parameter K can take values from 8 to 17, $8 \leq K \leq 18$, and $x_0$ and $x_1$ are the constituent m-sequences:

$$x_0(i+7) = (x_0(i+4) + x_0(i)) \mod 2 \quad x_1(i+7) = (x_1(i+1) + x_1(i)) \mod 2 \quad (34)$$

In some embodiments, the PBCH-DMRS method 900 utilizes a pseudo-random sequence defined by two sequences generated with a LFSR of length seven. The output sequence c(n) of length $M_{PN}$, where $n = M_{PN} - 1$, is defined by:

$$c(n) = (x_1(n+k_1) + x_2(n+k_2)) \mod 2 \quad x_1(n+7) = (x_1(n+4) + x_1(n)) \mod 2 \quad x_2(n+7) = (x_2(n+1) + x_2(n)) \mod 2 \quad (35)$$

where, in some embodiments, the first m-sequence is initialized with $x_1(6) = 1$, $x_1(n) = 0, n = 0, 1, \ldots, 5$, the second m-sequence is initialized with $x_2(6) = 1$, $x_2(n) = 0, n = 0, 1, \ldots, 5$, and shift values $k_1$ and $k_2$ are determined by part of the SS Block index within the SS burst set and the physical cell ID.

The UE-specific reference-signal sequence r(m) is QPSK modulated and is defined by:

$$r(m) = \frac{1}{\sqrt{2}}(1 - 2 \cdot c(2m)) + j\frac{1}{\sqrt{2}}(1 - 2 \cdot c(2m+1)), \quad (36)$$

$$m = 0, 1, \ldots, 6N_{RB}^{PBCH} - 1$$

where $N_{RB}^{PBCH} = 24$. In some embodiments, the cyclic shift parameters, $k_1$ and $k_2$, of the pseudo-random sequence generator is set with:

$$k_1 = 8 \cdot \lfloor N_{ID}^{cell}/127 \rfloor + N_{ID}^{SSblock} \quad k_2 = N_{ID}^{cell} \mod 127 \quad (37)$$

at the start of each SS block transmission instance, where $N_{ID}^{SSblock}$ is the value represented by the three least significant bits of the SS Block index within the SS Burst Set, and $N_{ID}^{cell}$ is the physical cell ID. In case SS Block index within the SS Burst Set consists of two bits, $N_{ID}^{SSblock}$ is the value represented by those two bits.

Frequency First Mapping

In some embodiments, according to the PBCH-DMRS method 900, for a physical resource block with frequency-domain index $n_{PRB}$ assigned for the corresponding PBCH transmission, the reference signal sequence r(m) can be mapped to complex-valued modulation symbols $a_{k,l}$, where k and l represent subcarrier and OFDM symbol index, respectively, within a SS block, in a subframe according to:

$$a_{k,l} = r(l' \cdot 3N_{RB}^{PPBCH} + m') \quad (38)$$

$$k = 4 \cdot (m') + 2 + N_{sc}^{RB} \cdot n_{PRB} \quad (39)$$

$$l = \begin{cases} 1 & l' = 0 \\ 3 & l' = 1 \end{cases}$$

$$m' = 0, 1, \ldots, 3N_{RB}^{PBCH} - 1$$

Figure 16:
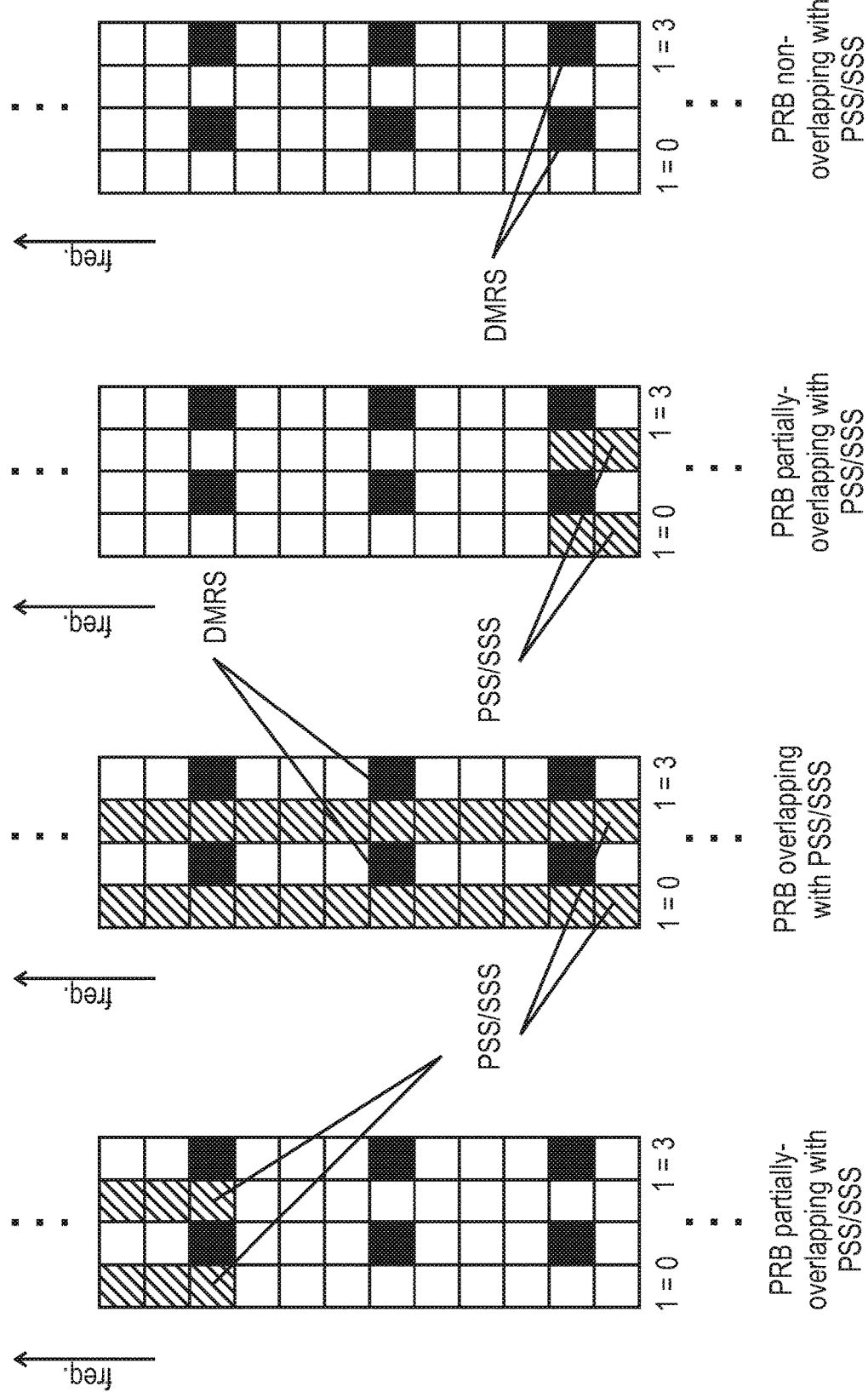
FIG. 16 illustrates time frequency structure of four alternative synchronization signal blocks in New Radio, in accordance with some embodiments.

FIG. 16 illustrates a proposed mapping between the primary synchronization signal/secondary synchronization signal and the demodulation reference signals, according to some embodiments. In this example, the PSS/SSS occupy the first and third symbols while DMRS occupy the second and fourth symbols. By aligning the start and end of the PSS/SSS with the DMRS, some benefits result during channel estimation, in some embodiments.

Time First Mapping

Alternatively, the PBCH-DMRS method 900 enables the physical resource elements for the DMRS to be mapped in the time domain first. In a physical resource block with frequency-domain index $n_{PRB}$ assigned for the corresponding PBCH transmission, the reference signal sequence r(m) can be mapped to complex-valued modulation symbols $a_{k,j}$, where k and l represent subcarrier and OFDM symbol index, respectively, within a SS block, in a subframe according to:

$$a_{k,l} = r(l' + 2 \cdot m') \quad (40)$$

$$k = 4 \cdot (m') + 2 + N_{sc}^{RB} \cdot n_{PRB} \quad (41)$$

$$l = \begin{cases} 1 & l' = 0 \\ 3 & l' = 1 \end{cases}$$

$$m' = 0, 1, \ldots, 3N_{RB}^{PBCH} - 1$$

Randomization of the Initialization Value

The correlation of initialization value and the small bit difference between the initialization values of two Gold codes impact the partial cross correlation of the sequence generated with such Gold codes. To avoid the impact, the PBCH-DMRS method 900 enables initialization correlation between two sequences generated with the Gold code, and allows mapping of initialization value with very larger bit width to be used on the Gold code with smaller linear feedback shift register (LFSR) size compared with the initialization value, in some embodiments, a fixed output length hashing function is performed to the initialization value of the Gold Code, with the output of the hashing function being used to initialize the Gold code.

For example, the initialization value may consist of the UE ID ($n_{RNTI}$), the codeword index (q), the slot index ($n_s$), and the physical cell ID ($N_{ID}^{cell}$). For example:

$$c_{init} = \underbrace{n_{RNTI} \cdot 2^{19}}_{16 \text{ bits}} + \underbrace{q \cdot 2^{18}}_{1 \text{ bit}} + \underbrace{n_s \cdot 2^{10}}_{8 \text{ bits}} + \underbrace{N_{ID}^{cell}}_{10 \text{ bits}} \quad (42)$$

In some embodiments, the number of bits used to represent this initialization value is 35. This initialization value is unavailable to initialize the Gold code with LFSR size of 31. Therefore, in some embodiments, a hashing function of the original initialization value is used to obtain a randomized initialization value with 31 bits.

The hashing function could be computation of the cyclic redundancy check (CRC) based on the original initialization value. For example, based on $c_{init}$, a CRC with length of 31 could be computed. The computed CRC results (consisting of 31 bits) could be loaded as the initialization value of the Gold code, instead of directly loading the original initialization value.

In some embodiments, the PBCH-DMRS method 900 defines following polynomials with order of 31 to be used as a hashing function generator polynomial for randomizing initialization values for Gold code with length 31 LFSR:

$$g(x)=x^{31}+x^{3}+1 \quad (43)$$

$$g(x)=x^{31}+x^{3}+x^{2}+x^{1}+1 \quad (44)$$

$$g(x)=x^{31}+x^{13}+x^{8}+x^{3}+1 \quad (45)$$

$$g(x)=x^{31}+x^{16}+x^{8}+x^{4}+x^{3}+x^{2}+1 \quad (46)$$

$$g(x)=x^{31}+x^{20}+x^{15}+x^{5}+x^{4}+x^{3}+1 \quad (47)$$

$$g(x)=x^{31}+x^{20}+x^{18}+x^{7}+x^{5}+x^{3}+1 \quad (48)$$

$$g(x)=x^{31}+x^{21}+x^{12}+x^{3}+x^{2}+x^{1}+1 \quad (49)$$

$$g(x)=x^{31}+x^{23}+x^{22}+x^{15}+x^{14}+x^{7}+x^{4}+x^{3}+1 \quad (50)$$

$$g(x)=x^{31}+x^{25}+x^{19}+x^{14}+x^{7}+x^{3}+x^{2}+x^{1}+1 \quad (51)$$

$$g(x)=x^{31}+x^{27}+x^{23}+x^{19}+x^{15}+x^{11}+x^{7}+x^{3}+1 \quad (52)$$

$$g(x)=x^{31}+x^{27}+x^{23}+x^{19}+x^{15}+x^{11}+x^{10}+x^{9}+x^{7}+x^{6}+x^{5}+x^{3}+x^{2}+x^{1}+1 \quad (53)$$

The PBCH-DMRS method 900 thus enables generation of the DMRS reference signal for PBCH in New Radio. In addition to including several equations for calculating the initialization value, the embodiments herein further illustrate how to generate an initialization value of size larger than 31 bits, how to extract a reference signal from a long baseline sequence, and how to generate the reference signal without knowing the system bandwidth. The method 900 may also employ a fast-forward preshift parameter in calculating the initialization value and include the SS block time index in calculating the initialization value. The method 900 also discloses different generating polynomials that may be used in creating higher order initialization values.

In summary, the PBCH-DMRS method may be implemented in a first example by an apparatus of 5G enhanced Node B (gNB) comprising a radio frequency (RF) interface and baseband circuitry, including one or more processors to generate a reference signal (RS) sequence from a Gold code based on a pair of generating polynomials and an initialization value, wherein the initialization value comprises a cell identification (ID) parameter, upon which a modulus operation is performed by the one or more baseband processors, and separately, a mathematical floor operation is performed by the one or more baseband processors, and a synchronization signal (SS) block index parameter, and send the reference signal sequence to the RF interface.

Further to the first example or any other example discussed herein, in a second example, the modulus operation further comprises $N_{ID}^{cell}$ mod 4, wherein $N_{ID}^{cell}$ is the cell ID parameter.

Further to the first or second examples or any other example discussed herein, in a third example, the mathematical floor operation further comprises $\lfloor N_{ID}^{cell}/4 \rfloor$.

Further to the first, second or third examples or any other example discussed herein, in a fourth example, the generating polynomials comprise an order higher than 31.

Further to the first, second, third, or fourth examples or any other example discussed herein, in a fifth example, the initialization value is calculated by the one or more baseband processors using the following equation: $c_{init}=(I_{SSB}+1)\lfloor N_{ID}^{cell}/4 \rfloor+4I_{SSB}+N_{ID}^{cell}$ mod 4, wherein $N_{ID}^{cell}$ is the cell ID parameter and $I_{SSB}$ corresponds to the three least significant bits of the SS block index parameter.

Further to the first, second, third, or fourth examples or any other example discussed herein, in a sixth example, the initialization value is calculated by the one or more baseband processors using the following equation: $c_{init}=(I_{SSB}+1)(\lfloor N_{ID}^{cell}/4 \rfloor+1)+4I_{SSB}+N_{ID}^{cell}$ mod 4, wherein $N_{ID}^{cell}$ is the cell ID parameter and $I_{SSB}$ corresponds to the three least significant bits of the SS block index parameter.

Further to the first, second, third, or fourth examples or any other example discussed herein, in a seventh example, the initialization value is calculated by the one or more baseband processors using the following equation: $c_{init}=2^{12}(I_{SSB}+1)(\lfloor N_{ID}^{cell}/4 \rfloor+1)+2^6$ $((N_{ID}^{cell} \mod 4)+1)$ wherein $N_{ID}^{cell}$ is the cell ID parameter and $I_{SSB}$ corresponds to the three least significant bits of the SS block index parameter.

Further to the first example or any other example discussed herein, in an eighth example, the initialization value is calculated by the one or more baseband processors using the following equation: $c_{init}=2^{12}(I_{SSB}+1)(\lfloor N_{ID}^{cell}/4 \rfloor+1)+2^6$ $(I_{SSB}+(N_{ID}^{cell} \mod 4)+1)$ wherein $N_{ID}^{cell}$ is the cell ID parameter and $I_{SSB}$ corresponds to the three least significant bits of the SS block index parameter.

Further to the first, second, or third examples or any other example discussed herein, in a ninth example, the RS sequence is extracted from a baseline sequence obtained from the Gold code by the one or more baseband processors, and the extraction operation does not depend on an available system bandwidth.

Further to the ninth example or any other example discussed herein, in a tenth example, the one or more baseband processors extract the RS sequence from a baseline sequence by accessing a reference point in a frequency domain, extracting a first baseline RS sequence which expands to the right of the reference point, and extracting a second baseline RS which expands to the left of the reference point.

Further to the ninth example or any other example discussed herein, in an eleventh example, the one or more baseband processors extract the RS sequence from a baseline sequence by extracting a second RS sequence from a second baseline sequence, wherein the second baseline sequence is generated from a reciprocal of the Gold code.

Further to the first example or any other example discussed herein, in a twelfth example, the one or more baseband processors further pre-shift an output sequence by a pre-shift parameter for a given initialization value of the Gold code.

Further to the twelfth example or any other example discussed herein, in a thirteenth example, the pre-shift parameter is set to values between 23700 and 40000.

In a fourteenth example, the PBCH-DMRS method may be implemented by an apparatus of a User Equipment (UE) comprising a radio frequency (RF) interface and circuitry to generate a reference signal (RS) sequence from the wireless signal using a Gold code based on an initialization value, wherein the initialization value comprises a cell identification (ID) parameter, upon which a modulo-4 operation is performed by the one or more baseband processors, a mathematical floor operation of the cell ID parameter is performed by the one or more baseband processors, and a synchronization signal (SS) block index parameter and send the reference signal to the RF interface, wherein the initialization value is of an order higher than 31.

Further to the fourteenth example or any other example discussed herein, in a fifteenth example, the cell ID and SS block index parameter are used in multiplicative form as part of the initialization value.

Further to the fourteenth or fifteenth examples or any other example discussed herein, in a sixteenth example, the mathematical floor operation further comprises $\lfloor N_{ID}^{cell}/4 \rfloor$, wherein $N_{ID}^{cell}$ is the cell ID parameter.

Further to the fourteenth, fifteenth, or sixteenth examples or any other example discussed herein, in a seventeenth example, the initialization value is calculated by one or more baseband processors using the following equation: $c_{init}=2^5(I_{SSB}+1)\lfloor N_{ID}^{cell}/4 \rfloor+4I_{SSB}+N_{ID}^{cell} \mod 4$, wherein $N_{ID}^{cell}$ is the cell ID parameter and $I_{SSB}$ comprises the SS block index parameter.

Further to the fourteenth, fifteenth, or sixteenth examples or any other example discussed herein, in a eighteenth example, the initialization value is calculated by one or more baseband processors using the following equation: $c_{init}=2^{12}(I_{SSB}+1)(\lfloor N_{ID}^{cell}/4 \rfloor+1)+4I_{SSB}+N_{ID}^{cell} \mod 4$, wherein $N_{ID}^{cell}$ is the cell ID parameter and $I_{SSB}$ comprises the SS block index parameter.

Further to the fourteenth, fifteenth, or sixteenth examples or any other example discussed herein, in a nineteenth example, the initialization value is calculated by one or more baseband processors using the following equation: $c_{init}=2^{12}(I_{SSB}+1)(\lfloor N_{ID}^{cell}/4 \rfloor+1)+2^6$ $((N_{ID}^{cell} \mod 4)+1)$ wherein $N_{ID}^{cell}$ is the cell ID parameter and $I_{SSB}$ comprises the SS block index parameter.

Further to the fourteenth, fifteenth, or sixteenth examples or any other example discussed herein, in a twentieth example, the initialization value is calculated by one or more baseband processors using the following equation: $c_{init}=2^{12}(I_{SSB}+1)(\lfloor N_{ID}^{cell}/4 \rfloor 1)+2^6(I_{SSB}+(N_{ID}^{cell} \mod 4)+1)$ wherein $N_{ID}^{cell}$ is the cell ID parameter and $I_{SSB}$ comprises the SS block index parameter.

Further to the fourteenth example or any other example discussed herein, in a twenty-first example, the one or more baseband processors further pre-shift an output sequence by a pre-shift parameter for a given initialization value of the Gold code.

Further to the twenty-first example or any other example discussed herein, in a twenty-second example, the pre-shift parameter is set to values between 23700 and 40000 by the one or more baseband processors and generating polynomials used to generate the Gold code are of order 47.

Further to the twenty-second example or any other example discussed herein, in a twenty-third example, the generating polynomials are used for secondary synchronization signal generation by the one or more baseband processors under New Radio.

Further to the fourteenth example or any other example discussed herein, in a twenty-fourth example, the initialization value of the Gold code is randomized by the one or more baseband processors using a hashing function, resulting in an output and the output is set as an initialization value of the Gold code.

Further to the twenty-fourth example or any other example discussed herein, in a twenty-fifth example, the hashing function is a computation of cyclic redundancy check (CRC) of an initialization value by the one or more baseband processors.

In a twenty-sixth example, the PBCH-DMRS method may be implemented by an article comprising a computer-readable medium comprising instructions to cause an electronic device, upon execution of instructions by one or more processors of the electronic device, to receive an initialization value of a Gold code, wherein the initialization value results from a non-linear combination of a Cell ID parameter and a synchronization signal block time index parameter, wherein the Cell ID parameter comprises N bits for integer N, and generate a physical broadcast channel (PBCH) demodulation reference signal (DMRS) from the Gold code using N bits from the Cell ID parameter.

Further to the twenty-sixth example or any other example discussed herein, in a twenty-seventh example, the computer-readable medium further comprises instructions to cause the electronic device to split bits of the Cell ID parameter into two or more parts separated by other bits in a bitwise representation of the initialization value.

Further to the twenty-sixth example or any other example discussed herein, in a twenty-eighth example, the computer-readable medium further comprises instructions to cause the electronic device to perform a mathematical floor operation of the cell ID parameter.

While the foregoing examples are illustrative of the principles in one or more particular applications, it will be apparent to those of ordinary skill in the art that numerous modifications in form, usage, and details of implementation can be made without the exercise of inventive faculty, and without departing from the principles and concepts herein and will appreciate numerous modifications and variations therefrom. It is intended that the appended claims cover all such modifications and variations as fall within the true spirit and scope of the disclosed embodiments.

We claim:

1. An apparatus of a 5G enhanced Node B (gNB) comprising:
 a radio frequency (RF) interface; and
 baseband circuitry, including one or more baseband processors to:
  generate a reference signal (RS) sequence from a Gold code based on a pair of generating polynomials and an initialization value, wherein the initialization value comprises:
   a cell identification (ID) parameter, upon which:
    a modulus operation is performed by the one or more baseband processors; and
    separately, a mathematical floor operation is performed by the one or more baseband processors; and
   at least a portion of a synchronization signal (SS) block index parameter; and
  send the reference signal to the RF interface.

2. The apparatus of the gNB of claim 1, wherein the modulus operation further comprises $N_{ID}^{cell}$, wherein $N_{ID}^{cell}$ is the cell ID parameter.

3. The apparatus of the gNB of claim 1, wherein the mathematical floor operation further comprises $\lfloor N_{ID}^{cell}/4 \rfloor$.

4. The apparatus of the gNB of claim 1, wherein the generating polynomials comprise an order higher than 31.

5. The apparatus of the gNB of claim 1, wherein the initialization value is calculated based on the three least significant bits of the SS block index parameter.

6. The apparatus of the gNB of claim 1, wherein the RS sequence is extracted from a baseline sequence obtained from the Gold code by the one or more baseband processors, and the extraction operation does not depend on an available system bandwidth.

7. The apparatus of the gNB of claim 6, wherein the one or more baseband processors extract the RS sequence from a baseline sequence by:
 accessing a reference point in a frequency domain;
 extracting a first baseline RS sequence which expands to a right of the reference point; and
 extracting a second baseline RS which expands to a left of the reference point.

8. The apparatus of the gNB of claim 6, wherein the one or more baseband processors extract the RS sequence from a baseline sequence by:
 extracting a second RS sequence from a second baseline sequence, wherein the second baseline sequence is generated from a reciprocal of the Gold code.

9. The apparatus of the gNB of claim 1, wherein the one or more baseband processors further pre-shift an output sequence by a pre-shift parameter for a given initialization value of the Gold code.

10. The apparatus of the gNB of claim 9, wherein the pre-shift parameter is set to values between 23700 and 40000.

11. The apparatus of the gNB of claim 1, wherein the initialization value results from a non-linear combination of the Cell ID parameter and the at least a portion of the synchronization signal block time index parameter, wherein the Cell ID parameter comprises N bits for integer N; and
 the one or more baseband processors generate a physical broadcast channel (PBCH) demodulation reference signal (DMRS) from the Gold code using N bits from the Cell ID parameter.

12. The apparatus of the gNB of claim 1, wherein the one or more baseband processors are configured to split bits of the Cell ID parameter into two or more parts separated by other bits in a bitwise representation of the initialization value.

13. The apparatus of the gNB of claim 1, wherein the cell ID and the at least a portion of SS block index parameter are used in multiplicative form as part of the initialization value.

14. An apparatus of a User Equipment (UE) comprising:
 a radio frequency (RF) interface; and
 baseband circuitry, including one or more processors to:
  generate a reference signal (RS) sequence from a Gold code based on an initialization value, wherein the initialization value comprises:
   a cell identification (ID) parameter, upon which:
    a modulo-4 operation is performed by the one or more baseband processors; and
    a mathematical floor operation of the cell ID parameter is performed by the one or more baseband processors; and
   at least a portion of a synchronization signal (SS) block index parameter; and
  receive a reference signal from the RF interface; and
  process the reference signal based on the RS sequence.

15. The apparatus of the UE of claim 14, wherein the cell ID and the at least a portion of the SS block index parameter are used in multiplicative form as part of the initialization value.

16. The apparatus of the UE of claim 14, wherein the mathematical floor operation further comprises $\lfloor N_{ID}^{cell}/4 \rfloor$, wherein $N_{ID}^{cell}$ is the cell ID parameter.

17. The apparatus of the UE of claim 14, wherein the initialization value is calculated based on the three least significant bits of the SS block index parameter.

18. The apparatus of the UE of claim 14, wherein the one or more baseband processors further pre-shift an output sequence by a pre-shift parameter for a given initialization value of the Gold code.

19. The apparatus of the UE of claim 14, wherein the initialization value of the Gold code is randomized by the one or more baseband processors using a hashing function, resulting in an output and the output is set as an initialization value of the Gold code.

20. The apparatus of the UE of claim 19, wherein the hashing function is a computation of cyclic redundancy check (CRC) of an initialization value by the one or more baseband processors.

* * * * *